(12) United States Patent
Caruso

(10) Patent No.: US 8,245,443 B1
(45) Date of Patent: Aug. 21, 2012

(54) GARDENING COMPONENTS

(76) Inventor: Steven Jerome Caruso, Antioch, IL (US)

( * ) Notice: Subject to any disclaimer, the term of this patent is extended or adjusted under 35 U.S.C. 154(b) by 562 days.

(21) Appl. No.: 12/380,536

(22) Filed: Feb. 28, 2009

Related U.S. Application Data

(60) Provisional application No. 61/067,702, filed on Feb. 29, 2008.

(51) Int. Cl.
*A01G 9/02* (2006.01)
*A47G 7/00* (2006.01)
(52) U.S. Cl. ............... 47/83; 47/39; 211/85.23
(58) Field of Classification Search ............... 47/83, 39; 211/194, 188; 248/146; 220/4.26; 108/91, 108/107
See application file for complete search history.

(56) References Cited

U.S. PATENT DOCUMENTS

| | | | | |
|---|---|---|---|---|
| 3,164,260 A | * | 1/1965 | Seeman | 211/189 |
| 4,420,902 A | * | 12/1983 | Rayner | 47/86 |
| 4,571,200 A | * | 2/1986 | Serna | 446/85 |
| 4,871,076 A | * | 10/1989 | Schramm | 211/189 |
| 7,373,753 B1 | * | 5/2008 | Caruso | 47/83 |
| 2006/0138066 A1 | * | 6/2006 | Hung et al. | 211/189 |

* cited by examiner

*Primary Examiner* — Kristen C Hayes

(57) ABSTRACT

Systems for the construction of a variety of planting configurations are disclosed. Some of the disclosed embodiments may be equally applicable for products such as shelving systems. The systems may include various shaped troughs and support surfaces and various methods of assembling the same. The various components and resulting configurational possibilities disclosed provides the user with functionality and aesthetic possibilities never before available, and is well suited for both commercial and residential applications. The device may also be made to be foldable or collapsible in nature. As such, the unit may be folded and stored when not in use so that the device does not take up space when it is to be stored. And is equally easy to unfold and put into use when it is to be used.

20 Claims, 49 Drawing Sheets

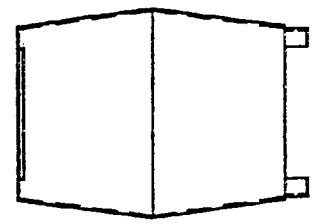
FIGURE 28
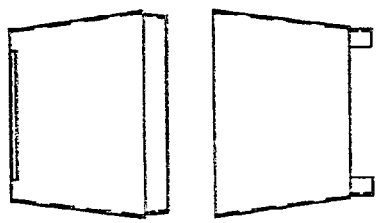
FIGURE 29

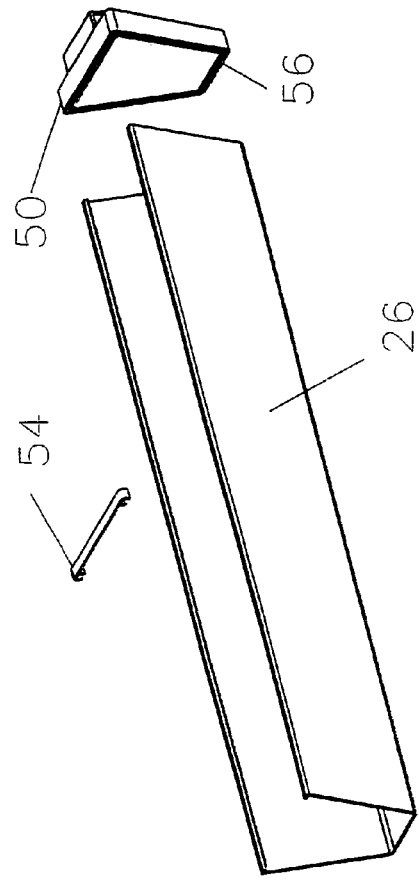
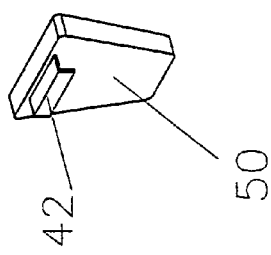
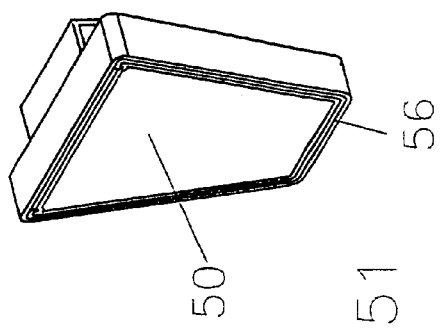
FIGURE 35
FIGURE 51

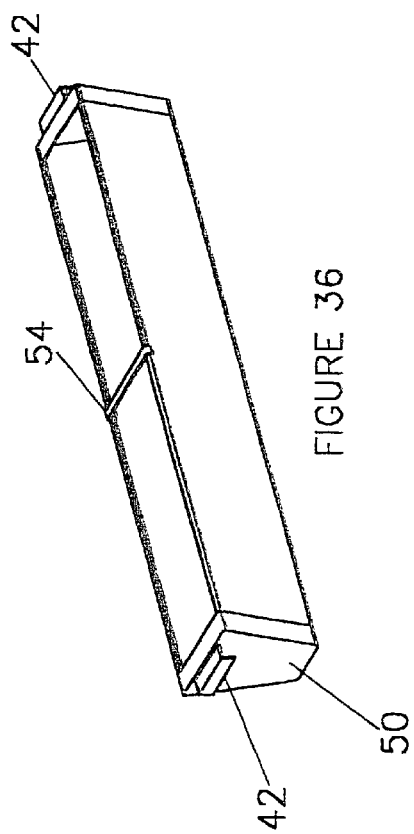
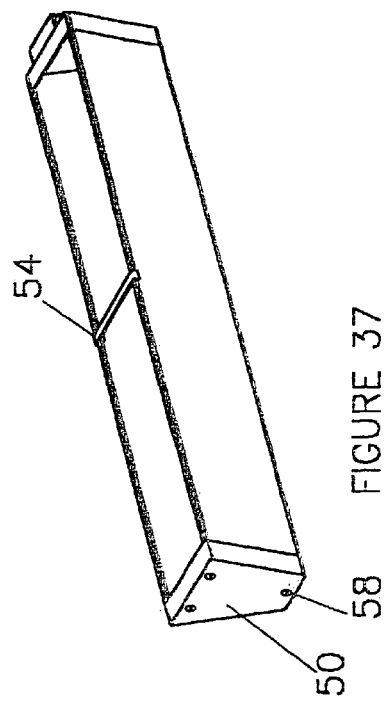

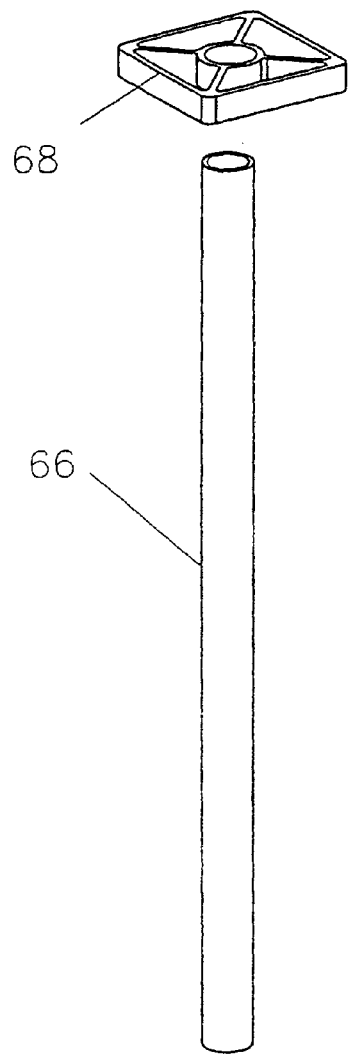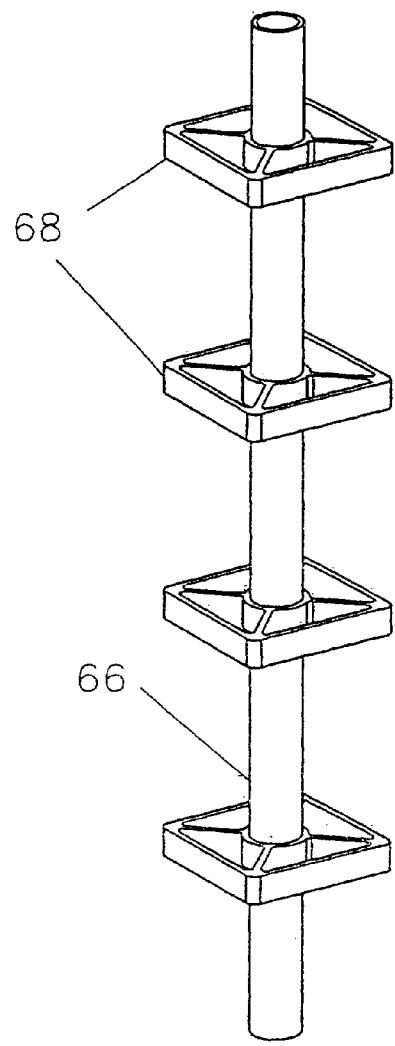
FIGURE 41
FIGURE 42

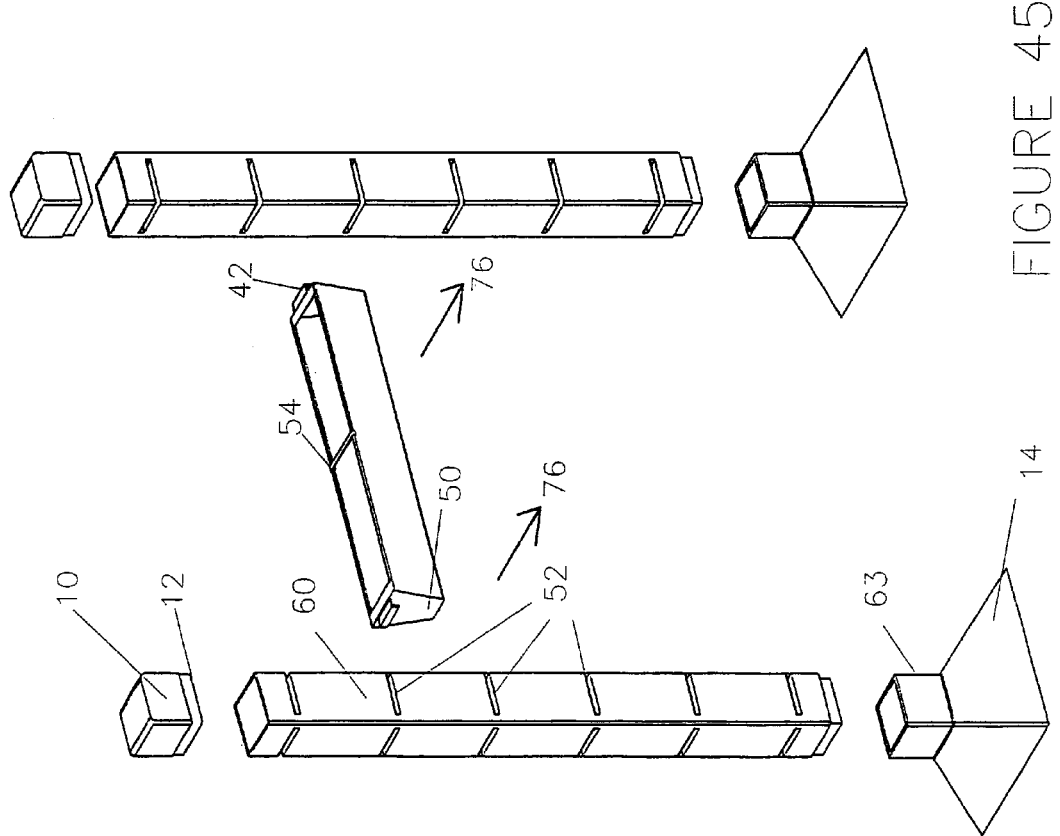

GARDENING COMPONENTS

RELATED APPLICATIONS

This application claims priority from Provisional Application Ser. No. 61/067,702, filed Feb. 29, 2008. This application is also related to application Ser. No. 11/010,952, now U.S. Pat. No. 7,373,753, which is a continuation-in-part of U.S. application Ser. No. 10/264,495, filed Oct. 4, 2002, now abandoned, which claims priority from Provisional Application Ser. No. 60/326,953, filed Oct. 4, 2001. Each application referred to in this paragraph is incorporated here by reference in its entirety to provide continuity of disclosure.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to the planters, potting systems and other arrangements that are used in gardening. More specifically, this invention is directed at row planters, which may be elevated, and stacked to create a vertical planting arrangement, which could be referred to as a garden wall.

In the art of gardening and the care of plants it is known that various arrangements have been used to contain the plants and their respective planting medium. Several modular arrangements have been put forth. There have also been methods that attach or hang the planting container on another surface.

There are limitations to all of these methods though. The formats are only modular in a limited way, is limited in versatility of application, is limited in configurability, is instable in construction, and are expensive to manufacture.

BRIEF SUMMARY OF THE INVENTION

The present invention is intended to provide an improved means of storing and caring for plants in reduced floor space. One aspect of this invention is directed at, but not limited to, a complete system for the growing of plants that gives the end-user components for the assembly of the same. Such a system not only reduces the required space, but also provides improved aesthetic viewing and care of plants, and can serve as a divider wall or partition.

BRIEF DESCRIPTION OF SEVERAL VIEWS OF THE DRAWINGS

FIG. 28 is a front view of the two pieces that comprise an end block in a ready to assemble position.

FIG. 29 is a front plan view of a method of construction of the invention.

FIG. 35 is a trimetric view of a sub-assembly of the invention in a ready to assemble relationship.

FIG. 36 is a trimetric view of the sub-assembly found in FIG. 35 in an assembled relationship.

FIG. 37 is a trimetric view of a sub-assembly of the invention in an assembled relationship.

FIG. 41 is a trimetric view of the invention in a ready to assemble relationship.

FIG. 42 is a trimetric view of a sub-assembly of the invention in an assembled relationship.

FIG. 45 is a trimetric view of the components of the invention in a ready to assemble relationship.

FIG. 51 is a trimetric view of an end cap 50.

REFERENCE CHARACTERS USED

Figure 1:
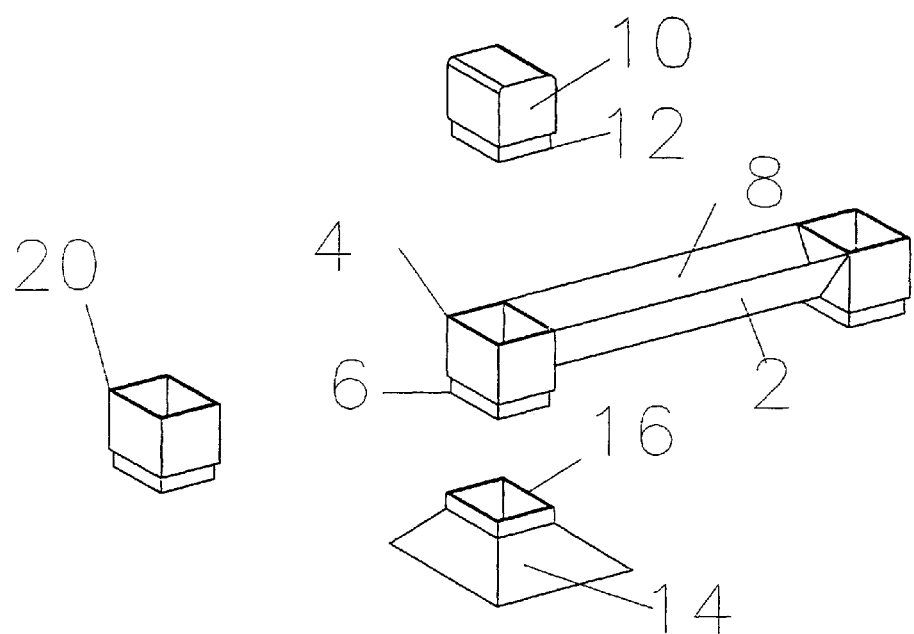
FIG. 1 is a trimetric view illustrating several of the major components of one embodiment of the invention.

The following reference characters are used in the drawings of refer to the parts of the present invention. Like reference characters indicate like or corresponding parts in the respective views.

2—Trough structure
4—Support receptacle.
6—Male component of 4
8—Trough interior
10—Top-capital
11—Intermediate support spacer element.
12—Male component of 10
14—Foot-pedestal
16—support receptacle of 14
18—Support timber
20—End spacer block
22—Independent continuous wall connector component.
24—Independent non-continuous end connector component.
26—independent trough component.
28—independent intermediate spacer component.
32—Round end spacer block
34—Round interface flange
36—Round female receptacle
38—end spacer block
40—Hook recess
42—Hook element of trough structure
44—Planking support flange
46—Reinforcement ribs
48—Planking position indicator to indicate relative position of planking when large or small timber is used.
50—End cap for 26.
52—Hook halo.
54—Structural strap/brace.
56—groove of 50
58—Mounting hole option of 50.
60—Post structure.
62—Modular block
63—Sleeve area of 62.
64—Sleeving/mating area of 14.
66—Pole structure.
68—Alternate hook halo.
70—Shelf structure
72—Slots of 60
74—Tongue
76—Motion arrows
78—Shelf with receptacles
80—Receptacles of 78
82—Top groove
84—Bottom groove 86—Rear filler panel
88—Sleeving features of 50
90—Front wall of 50
92—Return edge of 2/26
94—Corrugation or ribbing
96—Rib(s)
98—Second shell wall
100—First fastening surface of 54
102—second fastening surface of 54
104—Hinge point
106—Assembly holes
108—Strap of hanger-cross structure
110—Separate planter container
112—Spacer
124—Pivot point
128—Post structure
130—Top/Capitol
132—Base Structure
134—Pivot rod or tube
136—Generally circular halo
138—Connection element of 136
140—Bolt
142—Support frame
165—Planter Box

DETAILED DESCRIPTION OF THE INVENTION

While the invention will be described in connection with several preferred embodiments, it will be understood that the invention is not limited to these embodiments. On the contrary, the invention includes all alternatives, modifications, combinations, and equivalents as may be included within the spirit and scope of the appended claims.

There are several features that are common to all the embodiments. Plants are to be planted or placed into troughs formed by the invention. Said troughs are spaced in a vertical fashion relative to one another so as to allow the plants room to grow. While the shapes of the troughs could be of several cross-sectional shapes, it has been found that angular surfaces teach the plants to move outwardly, and cover the planting troughs, resulting in a full appearing planting. This shape is also conducive to a more efficient use of materials reducing cost to both manufacturer and end-user.

Referring to FIG. 1, one embodiment of the invention can be seen. In this embodiment there is a main trough area 2, a cap 10, and a base element 14. The only required piece for proper operation is the main trough 2. The other elements only serve to give a more finished appearance and added stability. All components could be manufactured by a variety of processes and materials. These could include sheet metal fabrication, injection-molded plastic, cast plastic/cement or a combination of processes/materials. The components and sub-components could be connected by a variety of means ranging from snap fittings to commercially available adhesives. As illustrated, the components sleeve together via male-female joints. Thus the male sleeve 12 of 10 can mate with the hole 4 in trough 2. Similarly, the male sleeve 6 of 2 (trough) can mate with the opening in the base unit 14. Additionally, the mating surfaces may be drafted or angled so as to tighten the fit when the units are assembled.

Figure 3:
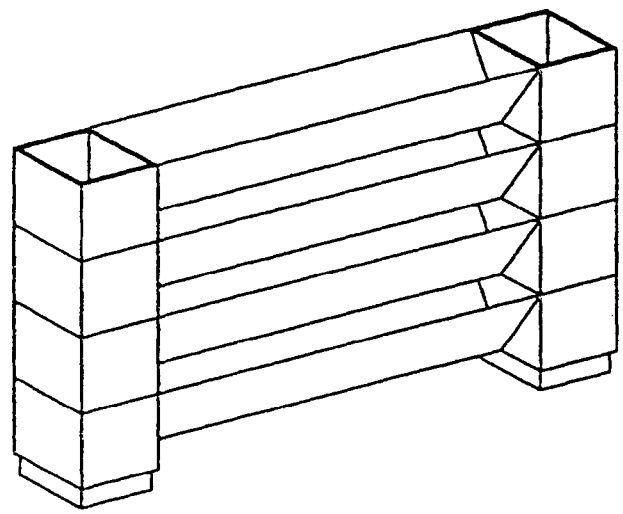
FIG. 3 is a trimetric view showing four of the major components of FIG. 1 in a stacked relationship.
Figure 4:
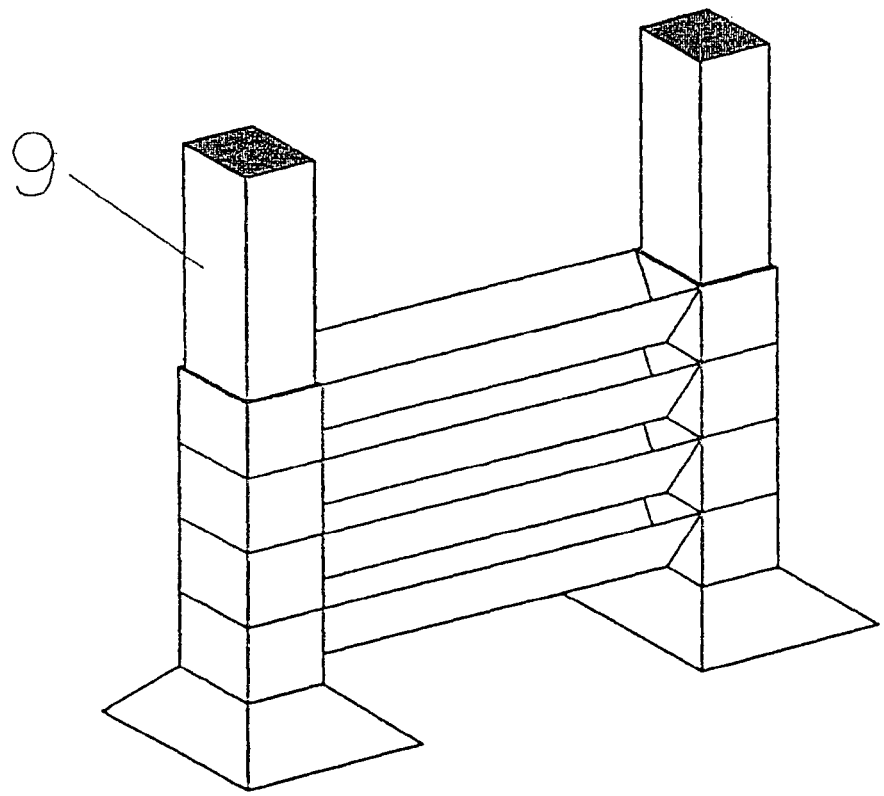
FIG. 4, is a trimetric view showing four of the major components of FIG. 1 in a stacked relationship further assembled on support timbers.
Figure 5:
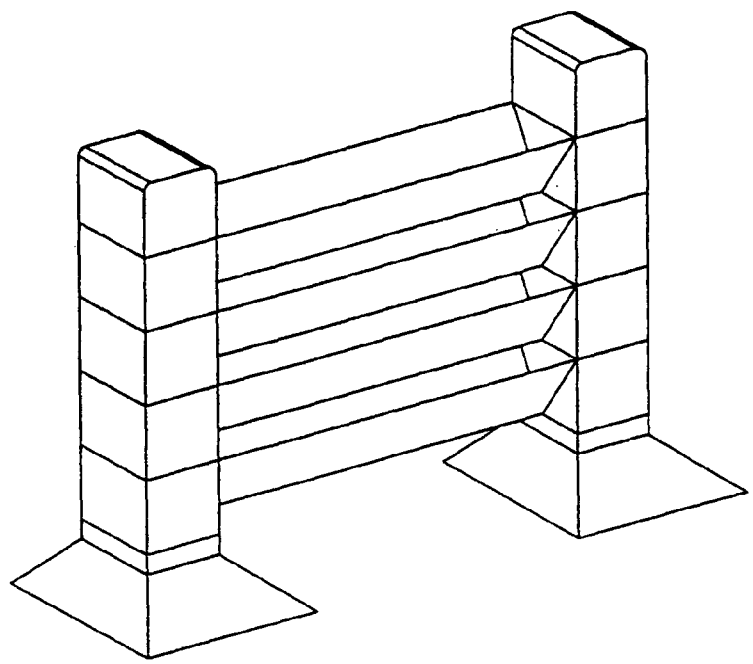
FIG. 5 is a trimetric view of the invention showing most of the major components of FIG. one assembled.
Figure 6:
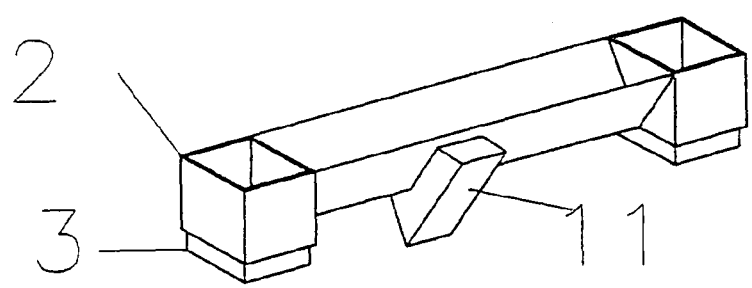
FIG. 6 is a trimetric view showing the main trough assembly with an additional support-spacer element.

In operation, any number of units may be stacked vertically. An assembly of four can be seen in FIG. 3. Referring to FIG. 4, the assembly of four has been combined with a pedestal 14 and a support timber 18. Such a support timber could be affixed to a suitable surface such as a deck, patio, or could be implanted into the ground. In any case the timber can serve to solidify the entire structure. Additionally, the timber 18 could be affixed to another timber (not shown) at its base, forming a T-leg structure so that the unit would benefit from added stability, and yet still be mobile. FIG. 5 shows the unit of FIG. 4 with the addition of a cap 10. In FIG. 6, it can be seen that it may be advantageous to add intermediate support structures 20 to increase the possible spans of the troughs.

Once the unit is assembled the user simply fills the troughs with a growing medium such as dirt and plants. Drain holes/slots can be provided at the base of each trough, and so it may be desirable to place a small amount of gravel or other aggregate material in the troughs prior to adding the growing medium.

Figure 7:
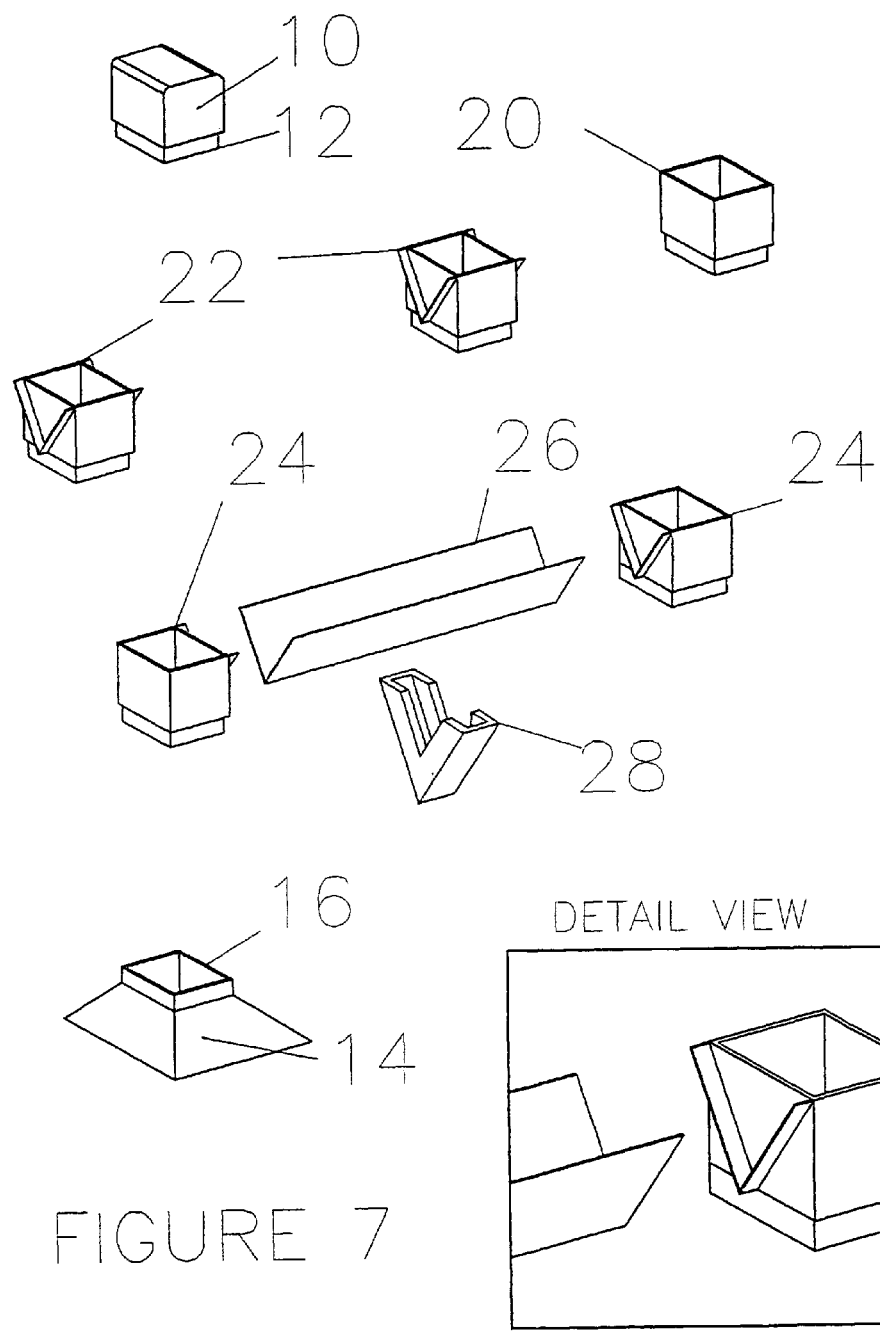
FIG. 7 is a trimetric view of another embodiment of the invention showing the main trough potentially being constructed of several pieces.
Figure 8:
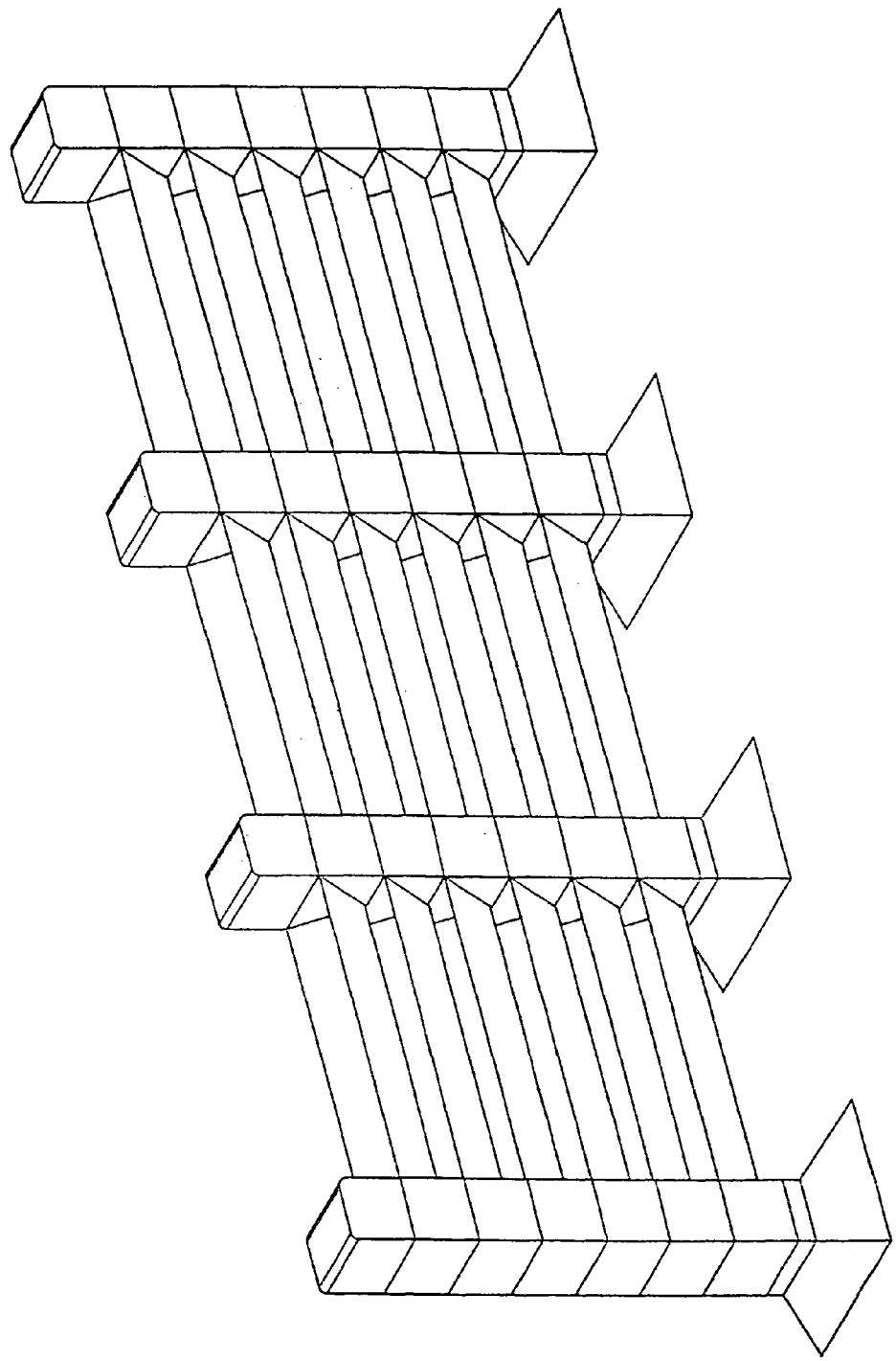
FIG. 8 is a trimetric view of the pieces of FIG. 7, showing how a continuous wall could be constructed.

FIG. 7 simply shows that the main trough component could be further divided into sub-components. The reasons for this are several; first of all it could be advantageous for manufacturing reasons. Another reason to make the units as sub-components is that the trough section 26 could be continuously extruded. Another reason is that the trough section 26 could be made in or cut to several lengths, which would make it so that the user could customize the lengths of the planter. Another reason to make the trough section 22 as a separate element will be realized by the following:

Referring to FIG. 8 one completed wall structure can be seen. In this case the elements of FIG. 7 were combined so that a continuous (more than one unit long) wall that shares post-structures was constructed. So, by making the unit from components, several types of end modules could be made available. Referring to FIG. 7, end block 24, is a single ended unit. End blocks 22, have provisions to attach troughs on either side of the unit. Additional blocks could include ones with provisions for right angle relationships of the troughs, and 4-way relationships. This demonstrates yet another reason why it could be advantageous in some form or another to make the trough-section as a separate element. The trough structure 2, as envisioned in FIG. 1, has some limitations in flexibility because of the fact that its end blocks are formed as part of the unit. Of course, if the main unit were made both as depicted in FIG. one, and as a single unit with the same flanges found on independent wall connector components, 22 and 24, and an independent trough component 26 were available, then it would be possible to create the wall structure found in FIG. 7.

Figure 9:
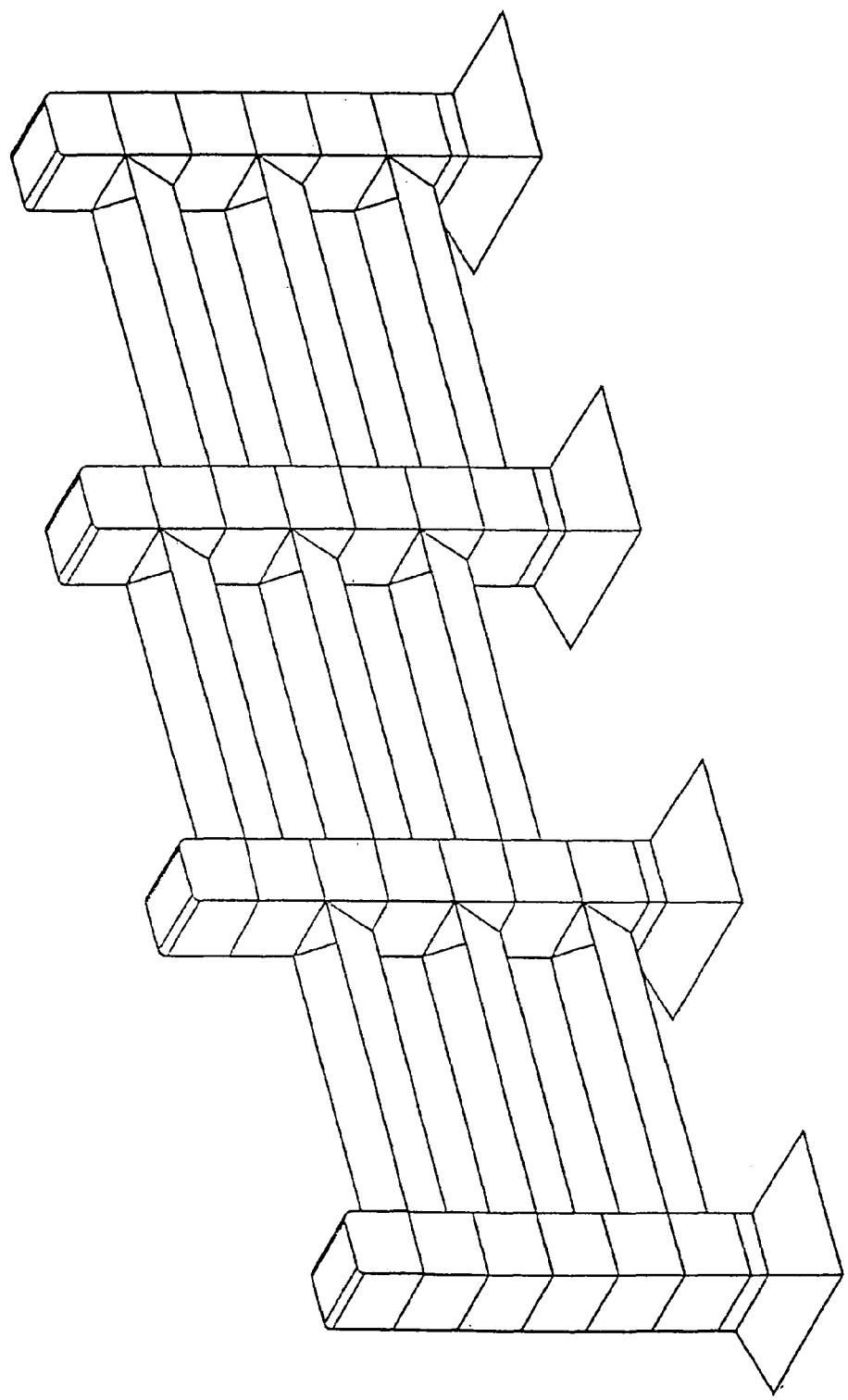
FIG. 9 is a trimetric view of the pieces of FIG. 1 and/or FIG. 7 assembled in a staggered fashion effectively doubling the vertical interval between trough areas.

Referring to FIG. 9 we can see the type of wall continuous (more than one unit long) wall unit that shares a common post structure can be constructed with the items only found in FIG. one. Note that a wall has been constructed where the troughs are staggered to effectively double the vertical trough interval from the top of one trough to the base of the next. While this is more limited in versatility than the options presented by the components of FIG. 7, it has its own benefits of reduction of parts and associated complexity. This is all the more true if one does not desire to build a continuous wall, but one of only one unit length by so many tall. Obviously, if the units did not share a post structure, the units would not have to be staggered and you would end up with a trough area then a post then another post then trough area situation.

Figure 2:
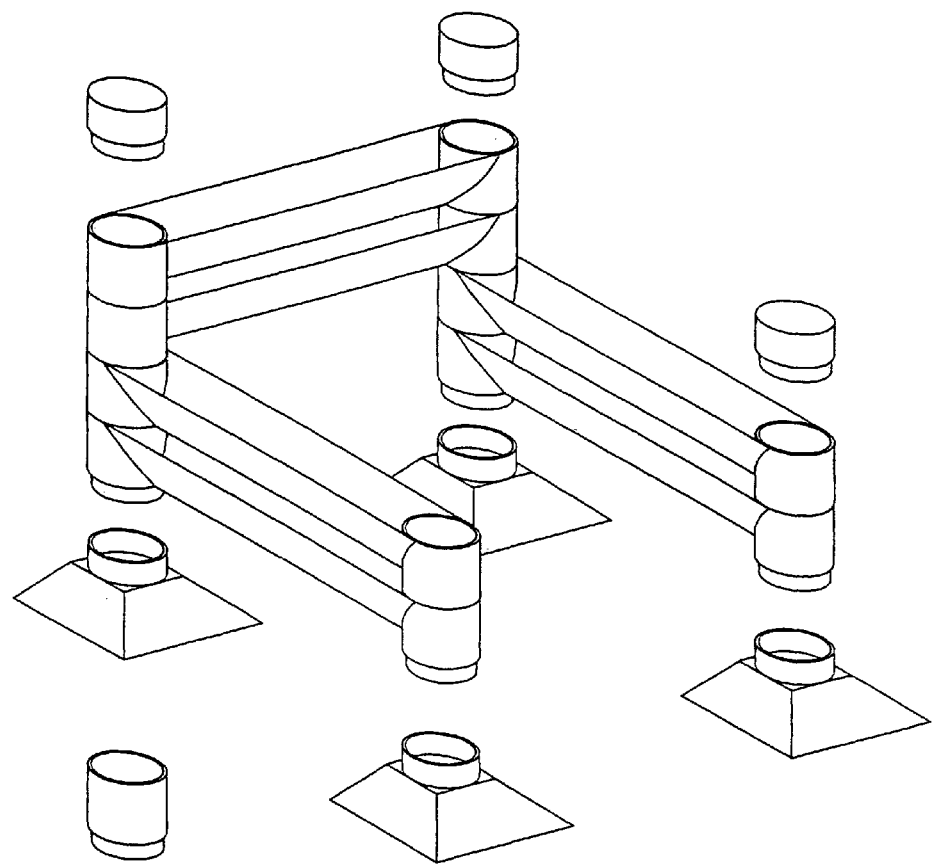
FIG. 2 is a trimetric view of the major components of a system that uses circular interconnections in a stacked relationship.

Referring to FIG. 2 another of the myriad of configurational possibilities can be seen. The units have been used at angles to each other and in vertical sets of twos.

Also referring to FIG. 2 another feature of the invention can be realized. In the preceding embodiments there was a square interface between the male flange and the female support receptacles. Now in FIG. 2 it can be seen that the interface is circular, and the outer shape of the end component compliments that fact, although it doesn't have to. The implications of this is that possible configurations now do not have to be linear or at right angles to each other. As a matter of fact with this type of interface/interconnection the angles formed between planters can be infinite. (NOTE: In the current illustration the relative positions of the planters are 90 degrees to each other, the same as would be achievable in previous embodiments.) Additionally, there are variations on this theme. The interconnecting members could have facets. One example of this would be a hexagon, which would allow 60-degree increments of movement between the members. Any number of facets could be chosen given that it is the same for the two given (male/female) interconnecting members. As for the other aspects of FIG. 2, it shares all the features and possibilities that exist in FIGS. 1, 3-7, and 25-26 such as, but not limited to end-caps, pedestals, allowance for timbers, and the ability to be made in sub-components.

Figure 24:
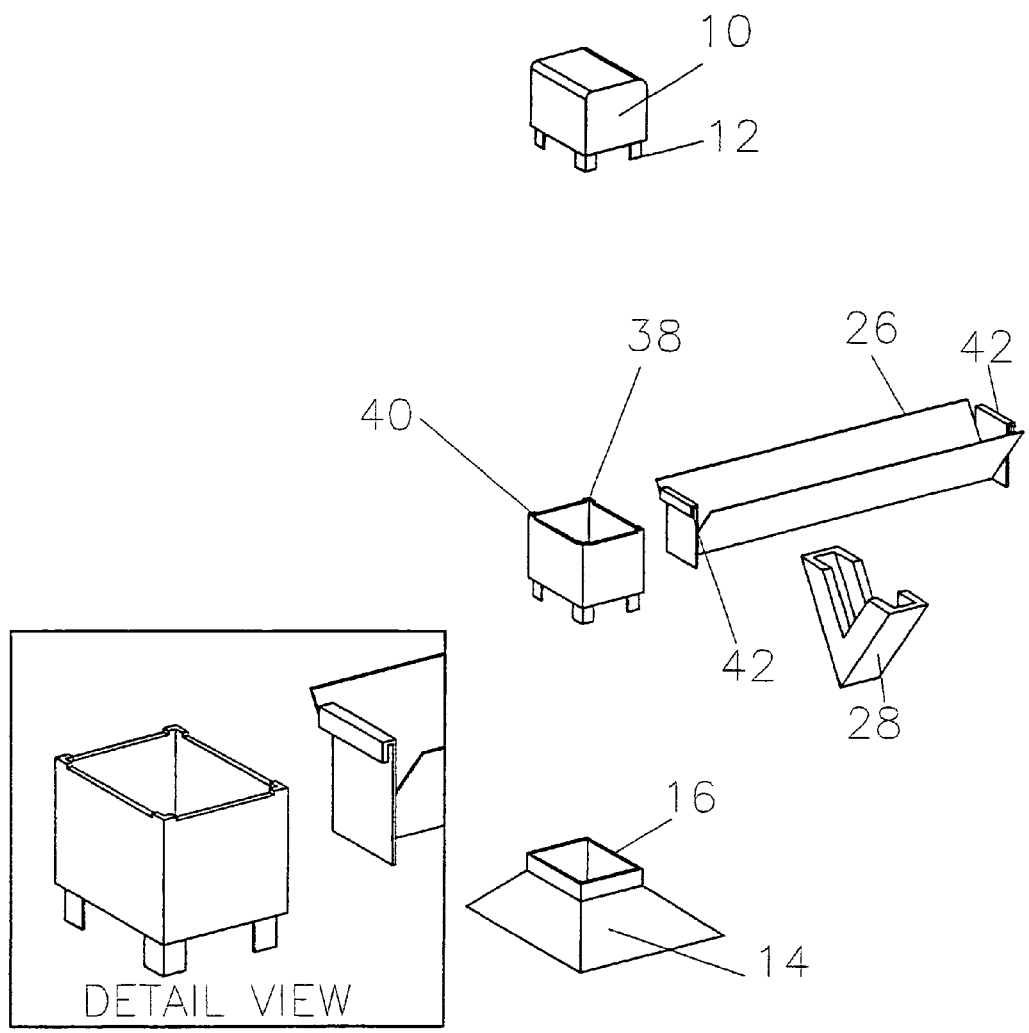
FIG. 24 is trimetric view of one embodiment of the invention showing various components that could be used.

Referring to FIG. 24, a system that reduces the required number of sub-components will be described. The basic parts bear similarities to parts already described in the previous application However, the methods used to connect the parts require fewer types of end spacer blocks to be provided, and yet all the desired configurations are possible.

Figure 25:
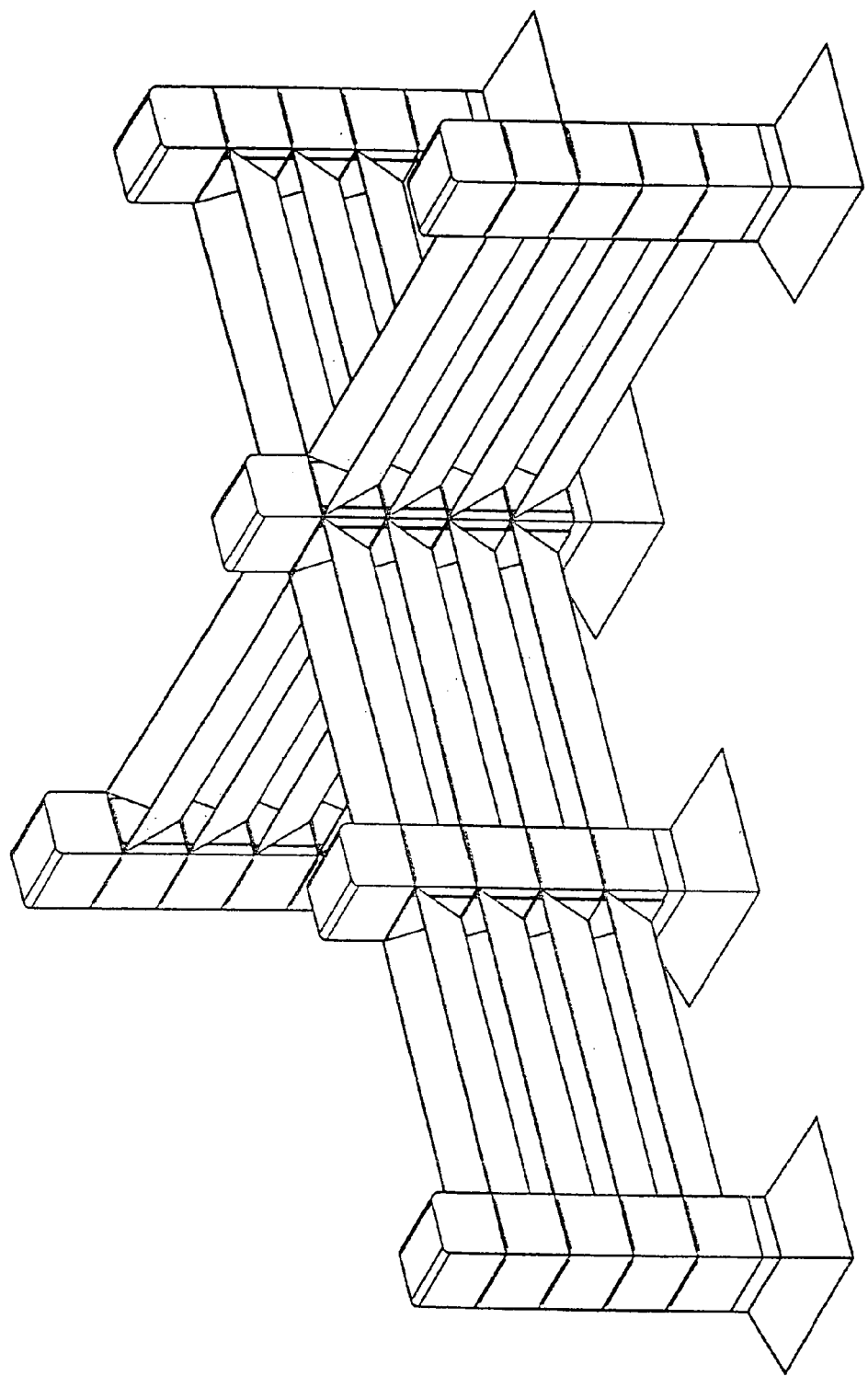
FIG. 25 is a trimetric view of an assembled wall structure.

The main trough, 26 now has a hook element 42 formed on either end. The end spacer block 38 has a hook recess 40 formed on four sides that is capable of receiving the hook 42 of the trough. So now the end spacer block is capable of having troughs affixed to any or all of its four sides, and additionally it can also function as a separate spacer block for when the user desires greater vertical spacing between troughs or spacer blocks are needed to even out the configuration as is the case in FIG. 9. Methods other than the hook and recess could be used to achieve the same results, ranging from peg-hole interfaces with snap-fits, to the use of screws. For aesthetic reasons, some features (such as holes) could be treated as knockout areas so that any connection faces on the end-spacer blocks that are not used are free from voids. Referring to FIG. 25, one possible of configuration of the components of FIG. 24 can be seen. Again the possibilities of various configurations are too numerous to completely illustrate.

Figure 30:
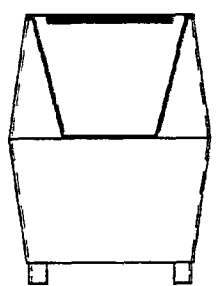
FIG. 30 is a right side view of FIG. 29.
Figure 31:
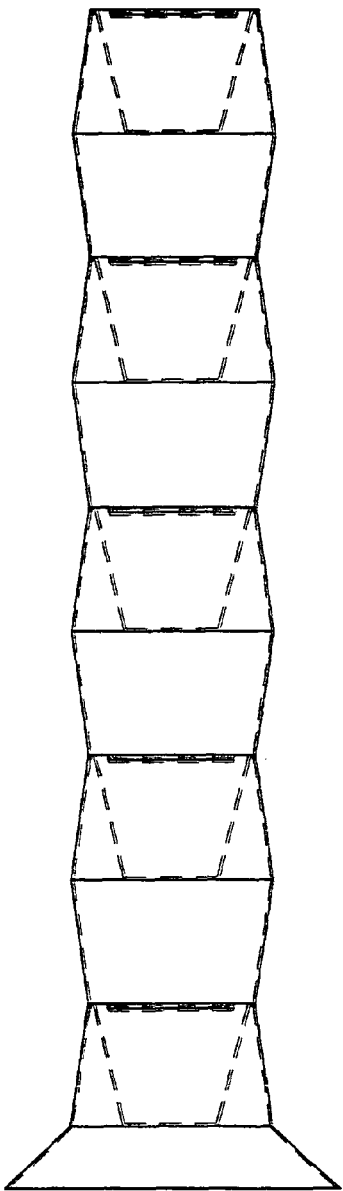
FIG. 31 is a right side end view of the components of FIG. 29 in a stacked configuration in conjunction with a base element.
Figure 32:
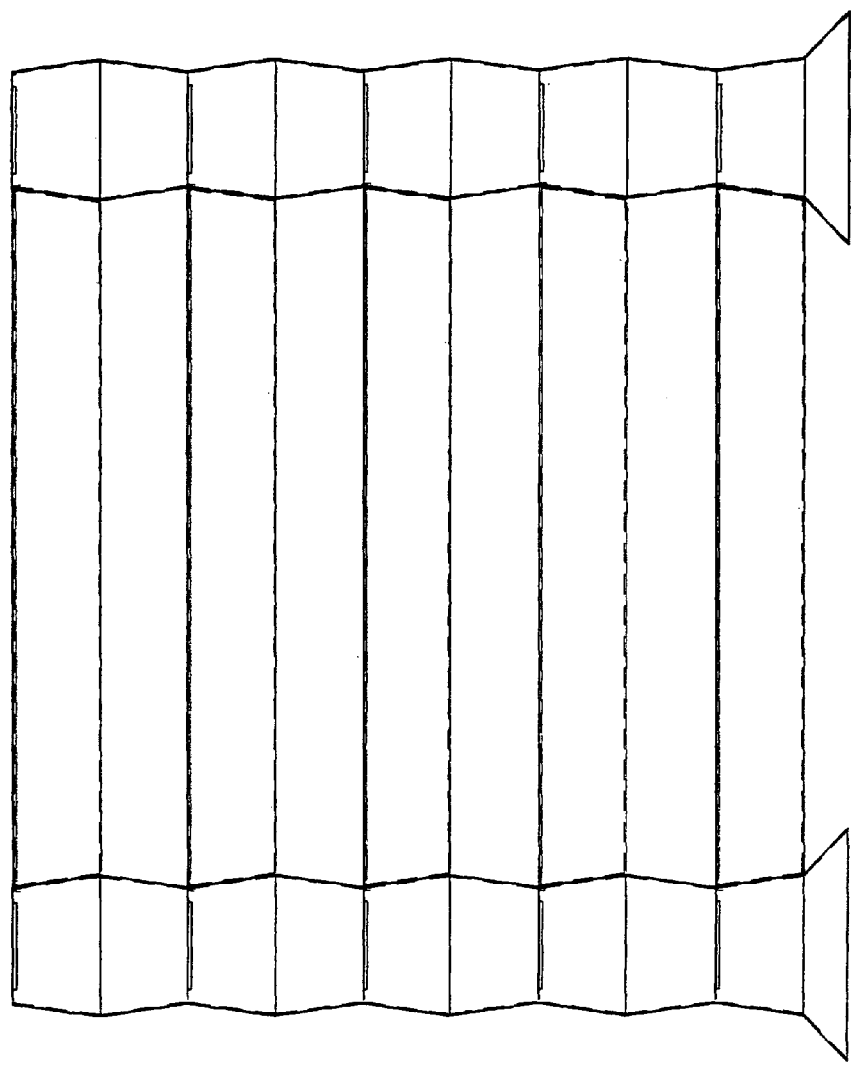
FIG. 32 is a front view of FIG. 31.
Figure 33:
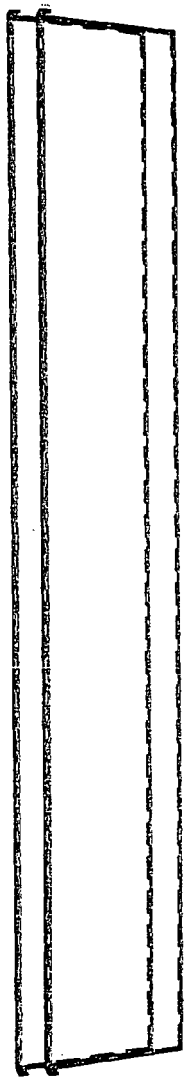
FIG. 33 is a front view of two of the troughs of FIG. 29 in a nested relationship.
Figure 34:
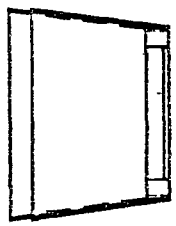
FIG. 34 is a front view of the two pieces that comprise an end block of FIG. 29 in a nested relationship.

Referring to FIGS. 28-34 a method of construction will be outlined that relates to the system found in FIG. 24. The end spacer block 38 of FIG. 24 has been constructed of two pieces as can best be seen in FIG. 28. The reason for this is that it may be desirable in some manufacturing situations such as injection molding, casting etc. to be able to draft (angle) the part. If the part were as single piece the resulting draft angles could make it so that if a piece were stacked with a like piece, the dimensional differences at their mating surfaces would be excessive. Thus, by making the spacer block in two pieces or as two components the draft differential nets out to zero every two pieces, and the mating surfaces meet appropriately. This can be seen in FIG. 29 where an assembly of the two components of FIG. 28 have been assembled and a trough is ready to be hung from the assemble end spacer block. Note that the trough has end walls that are complimentary in angle to the end spacer block. As outlined earlier, such end walls could be either formed as part of the trough or could be separate pieces when the major profile of the trough is to be made as a continuous independent trough component (i.e. a plastic continuous extrusion/casting/sheet metal profile). FIG. 30 is simply a right end view of FIG. 29. Another compelling reason for this construction lies in the fact that the components may be "nested" when not in use. This is can be an important factor for the manufacturer in warehousing, packaging, shipping, gaining valuable store shelf-space, and for the consumer in off-season storage. FIG. 33 shows two planting troughs in a nested relationship. Additional troughs could be added to the stack as desired. FIG. 34 shows the two components of FIG. 28 nested with each other. Here too, additional end-block components could be added and nested with the stack. FIG. 31 simply shows an end view assembly of the components already described in conjunction with a foot-pedestal also already described. Of note is an alternative trough profile, which provides a flat bottom making it so that the troughs may set well on a surface either for preparation, or when used outside of the system. As already mentioned, many profiles may be found desirable for both functional and decorative reasons. Obviously, a top cap could be provided in FIG. 31, and this embodiment shares all the aforementioned options and alternatives of other embodiments. FIG. 32 is simply a front view of FIG. 31.

Referring to FIGS. 35-42 and FIG. 51, another variation will be outlined. Referring first to FIG. 35, a structure that has already been disclosed can be seen, but perhaps with greater clarity. Component 26 is the independent trough component which mates with an end cap 50, which has formed, hook elements 42 as part of it. In this case the trough 26 fits into a groove 56, of the end cap 50. This is a preferred construction that gives the trough support from external forces in all directions, however, the end cap could be made to just mate with the inner surface of the trough, just the outer surface of the trough, or a butt joint as can be seen in FIG. 24. Of course, as already stated, the above assembly could be formed as a single piece, however, as also previously stated, several advantages may be realized if the trough 26 is formed as a constant profile such as an extrusion. Economy in manufacture, and the ability to factory, or site cut to length are two of the most prominent reasons already cited. The sub-assembly may be held together by any commonly known attachment means such as snaps, glue, ultrasonic bonding screws/rivets etc.

Figure 43:
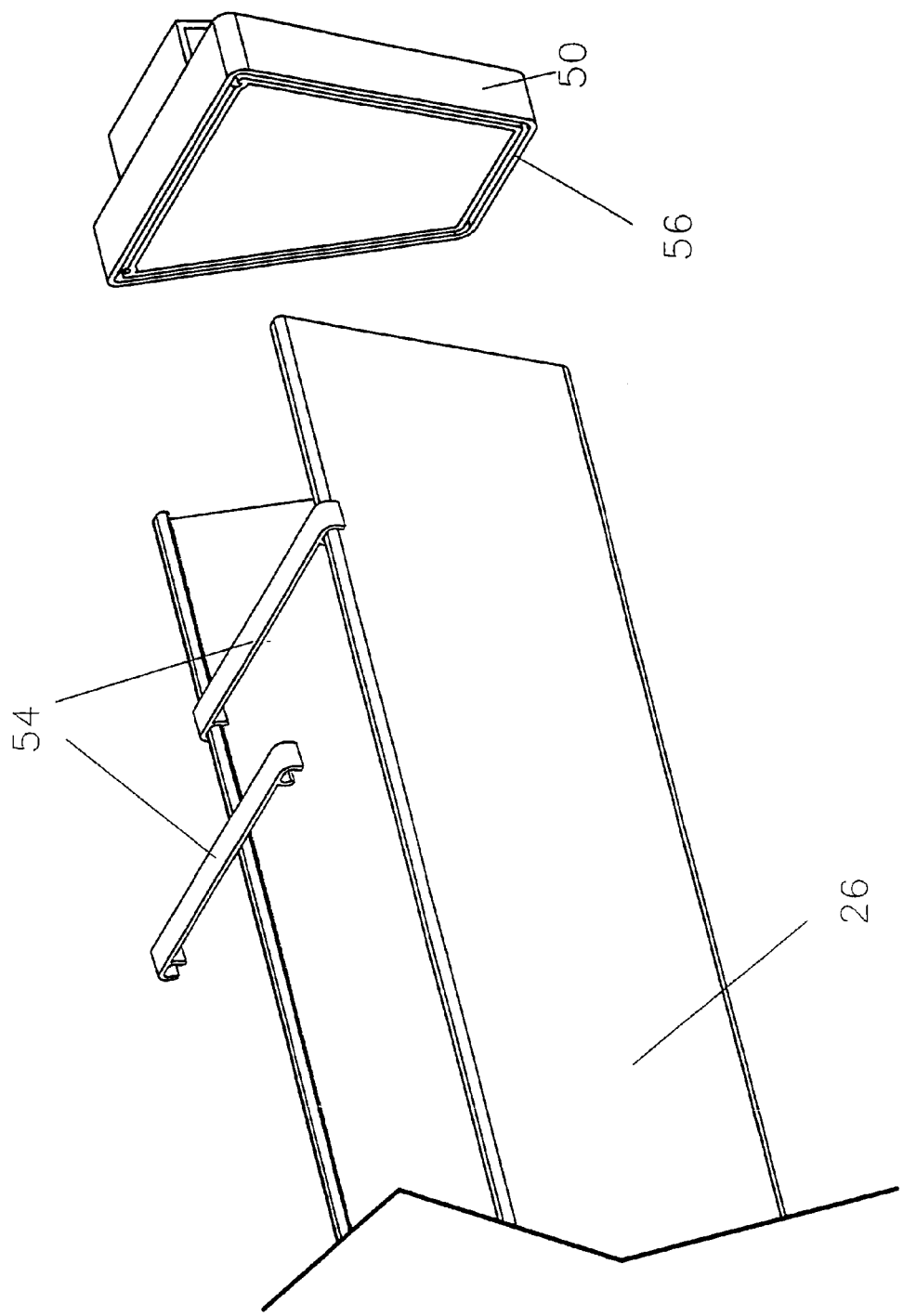
FIG. 43 is a trimetric view of some of the components of the invention in a ready to assemble relationship.

Component 54 in FIG. 35 is a strap that attaches along the edge of the trough. This strap may be desirable in resisting the outward forces of the contents of the trough. Such a strap could either attach at predetermined points trough the use of holes or lugs, or more preferably at any point along the trough. One way to accomplish this is to treat the strap as a clip. An undercut or other functionally similar feature made in the trough could aid the retention of this clip. This can best be seen by referring to detail FIG. 43. Further vertical support may be provided by incorporating a spacer element such as item 28 in FIG. 24 as a separate component or integrated into the trough structure.

FIG. 51 is simply an enlarged view of the end cap 50. FIG. 36 is FIG. 35 in its assembled form. FIG. 37 is essentially the same as FIG. 36 with the exception that the hook attachment feature has been replaced or substituted with mounting holes 58. These holes could accept bolts, screws, rivets, or like fasteners and simply serve as an alternate mechanical fastening means for the trough to its associated post structure.

Figure 39:
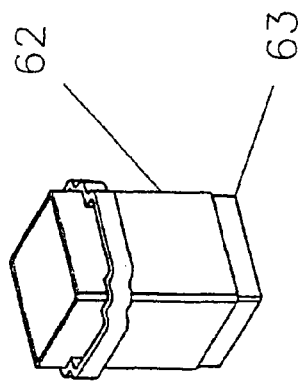
FIG. 39 is a trimetric view of a sub-assembly of the invention in an assembled relationship.
Figure 38:
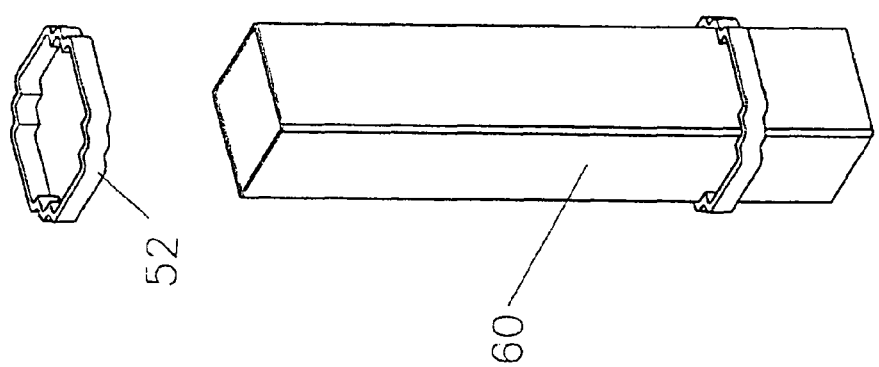
FIG. 38 is a trimetric view of a sub-assembly of the invention in a partially assembled/ready to assemble relationship.
Figure 40:
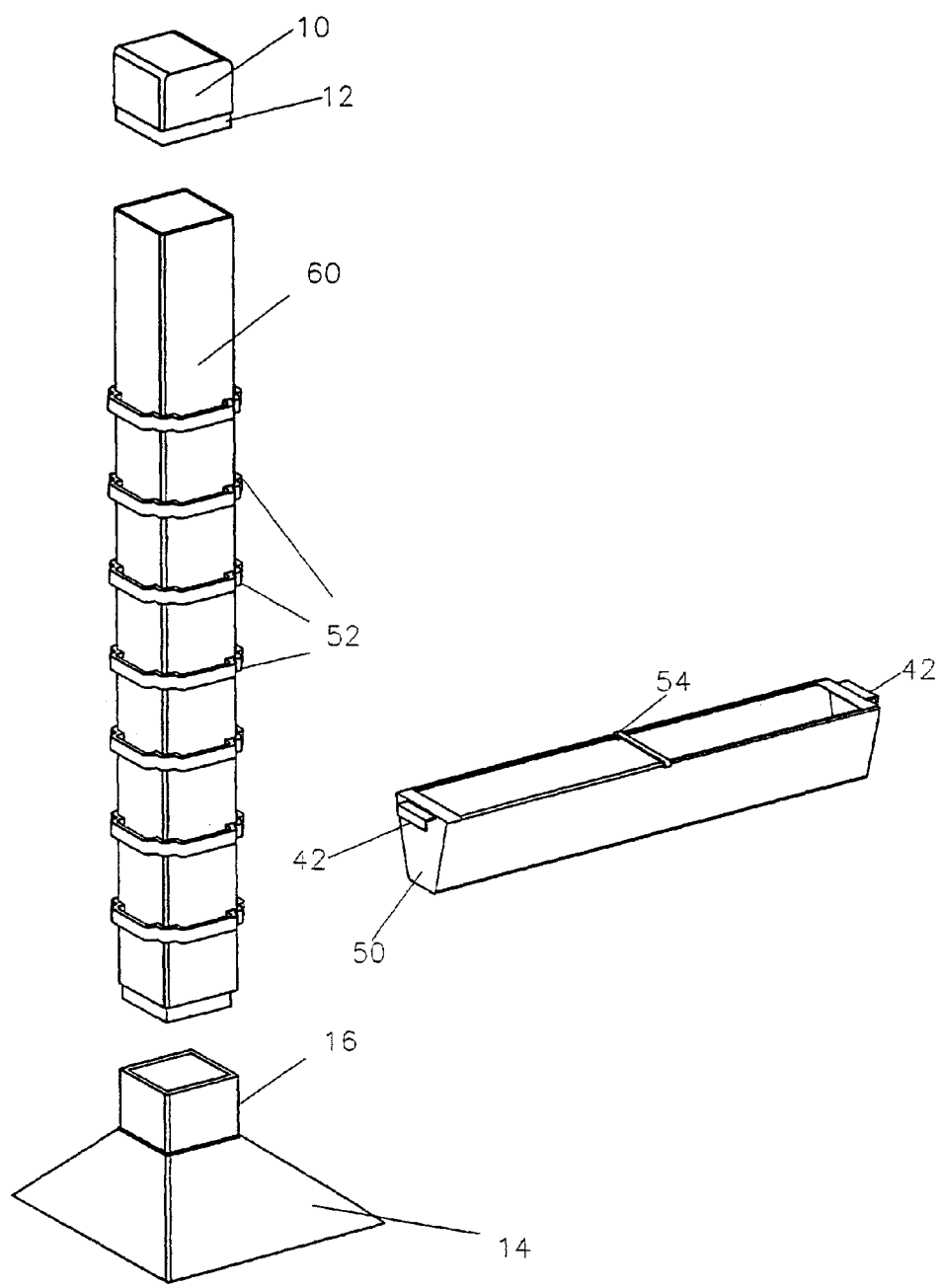
FIG. 40 is a trimetric view of the invention in a ready to assemble relationship.

FIG. 38 shows a hook-halo structure 52, in an assembled and in a ready to assemble position with a post element 60. FIG. 39 simply shows that the same arrangement could be accomplished in a form similar to the modular blocks previously described. FIG. 40 further describes the arrangements set forth, and shows the relative positions of the major components already described, all in relatively ready to assemble positions. Obviously, all alternatives previously set forth such as the ability to incorporate a support timber etc. are contemplated. Making the hook feature freely detachable relative to the support post enables the user to selectively remove any of the troughs at any time without having to disassemble any of the other components. This could be of particular help when arranging plants, maintaining plants, or maintaining the structure as whole. The hook-halos 52, could be produced as part of the post structure, however, several advantages may be realized by forming them as separate elements. The most notable of which is that the support post could be extruded for economy and the hook-halos attached by one of many common ways such as but not limited to mechanical fasteners (screws, rivets, etc.) or by bonding techniques such as adhesives or ultrasonic welding. So, a manufacturer may produce both the trough and support elements as continuous extruded profiles, then cut them to a variety of lengths, finish the ends of the troughs with end caps 50, finish the support members with hook-halos 52, bases 14 and top end caps 10, and have a fully modular system. Similarly, an end-user may obtain both the trough and support elements as continuous extruded profiles, then cut them to a variety of lengths, finish the ends of the troughs with end caps 50, finish the support members with hook-halos 52 (which could also be already affixed at the proper intervals by the manufacturer), bases 14, and top end caps 10, and have a fully modular system. Obviously, any of the various assemblies described could also be produced as single components instead of assemblies Additionally, the Hook-halos may be obviated through the use of the trough structure depicted in FIG. 37 which attaches directly to the support post 60. However, this results in a structure that is more difficult to assemble, or disassemble for storage and maintenance.

FIGS. 41-42 simply shows that by altering the hook-halo, a minimal support pole could be adapted to function similarly to the previously outlined situations.

Figure 44:
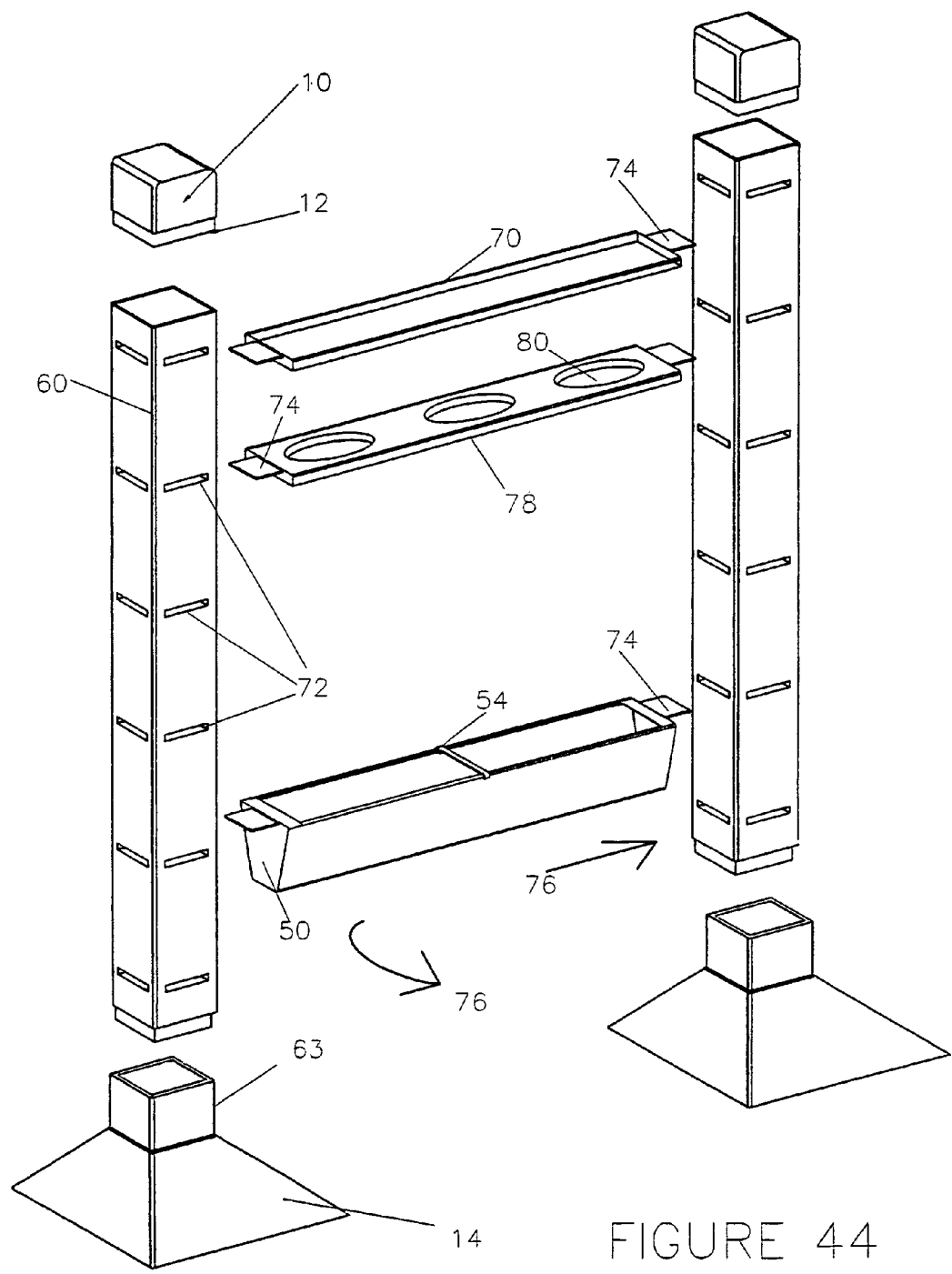
FIG. 44 is a trimetric view of the components of the invention in a ready to assemble relationship.

Another method that enables the user to selectively remove any of the troughs at any time without having to disassemble any of the other components can be seen in FIG. 44. In this embodiment the hook feature is replaced with a straight tongue feature 74. The spacing between the posts is great enough the troughs may be moved to one lateral extreme (towards one post or the other) thereby releasing one of the tongue features and then by pivoting the trough radially with respect to the support post/modular block upright structure that the remaining tongue is still engaged with, the user is able to disengage the remaining tongue/hook feature from its slot 72. The arrows 76 in FIG. 44 indicate the general disengagement motions. This assembly/disassembly technique may be accomplished with the hook arrangement in conjunction with this slot arrangement and others previously set forth in Figures (such as FIG. 24), as long as the hook-tongue receptacle 72 is appropriately sized.

Also of note in FIG. 44 is an alternately shaped trough member 70, which assumes more of a shelf profile. A shelf that can be used any place where a trough could, would enable the user to place conventional potted plants or any other display items in conjunction with or instead of other troughs. Another shelf style is depicted by shelf structure 78. It is characterized by 80, which are holes/receptacles or other means capable of receiving/holding/supporting potted plants or other decorative elements. The pots/containers used could be of a generic style or a custom style provided by the manufacturer. This would enable the user to individually insert, remove and care for the plants/items in an individual manner. In a minimal style, the shelf could assume a very open format and in addition to being formed by previously mentioned manufacturing processes it could be produced from formed wire. Additionally, such a shallow trough or flat shelf options could have any or all of the features options, and constructional variations as any of the other trough structures outlined in this disclosure.

Another method that enables the user to selectively remove any of the troughs at any time without having to disassemble any of the other components can be seen in FIG. 45. In this case the modular blocks, or the support post is provided with slots 72 that extend through at least one of the adjacent sidewalls that are perpendicular to the major hook-slot (in other words the slot extends through at least one corner). Though this construction, the trough structure (with either a hook or tongue feature) may be slid straight out in a motion perpendicular to the generally vertical orientation of the support posts/modular block upright structure. The arrows 76 in FIG. 45 indicate the general direction of motion required to disengage the trough/shelf structure from the support posts/modular block upright structure. As in most of the embodiments, provisions are made so that troughs may be hung on any or all four faces of the support post/modular block support. Of note, is the fact that, at each level, two slots are cut through one common corner, and the other two slots cut through another common corner. And, as can be seen in FIG. 45, the difference between the left and the right posts is that one is rotated 90 degrees to the other in order to facilitate the proper functional orientation (left to right) of the openings of the slots. Again, this assembly/disassembly technique may be accomplished with the hook arrangement in conjunction with this slot arrangement and others previously set forth in Figures (such as FIG. 24), as long as the hook-tongue receptacle 72 is appropriately sized. The slots 72, described in conjunction with FIGS. 44 and 45 may be produced as an integral part of the support posts/modular block upright structure, or as a void produced between an assembly of two or more pieces such as is the case in FIG. 24. Additionally, the tongue feature may work in a similar fashion to that of hook by providing an appropriate interfacing surface such as the described hook-halo 52, either integrally or as an additional component to the support posts/modular block upright structure.

Figure 47:
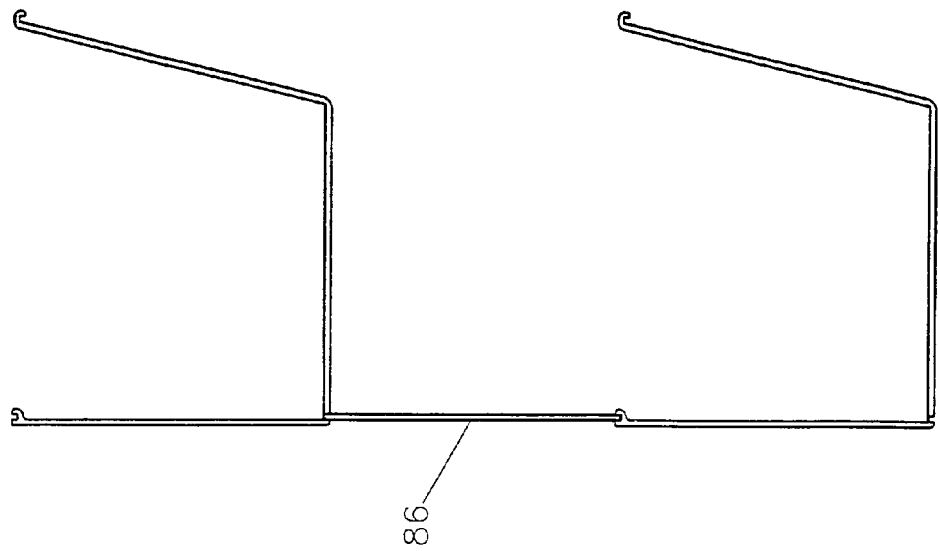
FIG. 47 is a side sectional view of two troughs assembled with a rear filler panel.
Figure 46:
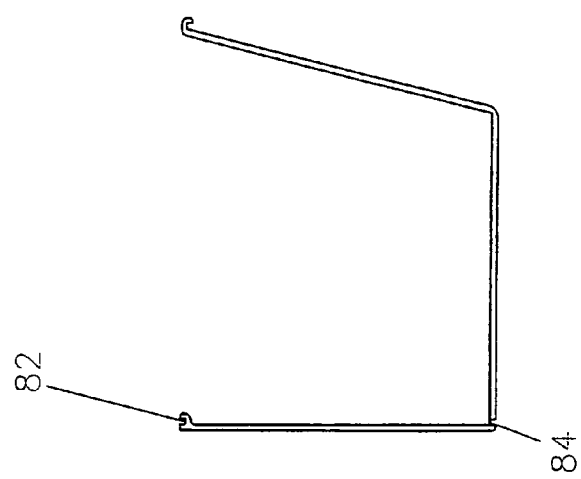
FIG. 46 is a side sectional view of a trough showing provisions for a rear filler panel.
Figure 49:
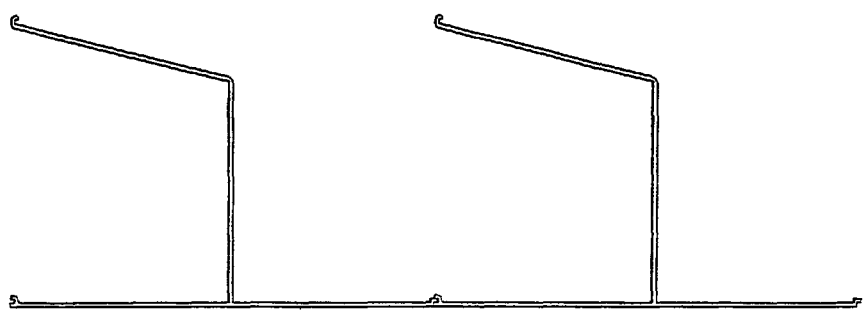
FIG. 49 shows an arrangement where each trough has a full leg extending from the top (or optionally the bottom) of each trough.
Figure 48:
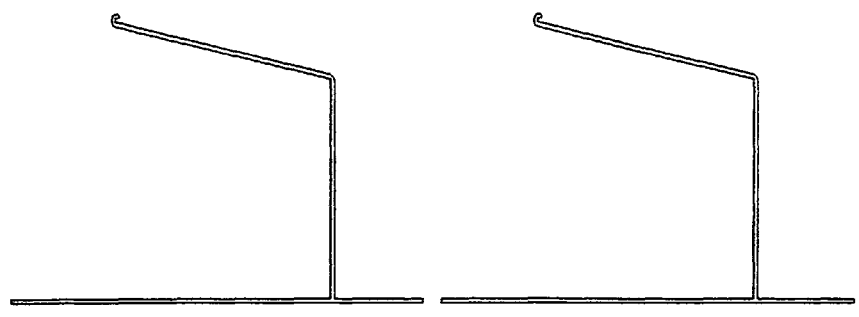
FIG. 48 shows an arrangement where each trough has a half leg extending from the top and bottom of each trough.

As mentioned in other embodiments of the invention, there are cases when it may be desirable to create a single faced or one-sided structure. As such, one side functions as the decorative trough-shelf side, and the other functions much as a predominantly flat-faced fence or divider. FIG. 46 shows a side sectional view of a one-sided trough. Such a trough is characterized by the grooves 82 and 84. Attachment means such as grooves snaps, screw holes could occur in several potential locations of an assembly. FIG. 47 shows two of the troughs of 46 in a stacked relationship with a rear filler panel in place in the grooves 82 and 84. The filler panel could be made by a variety of processes already described, and could be slid into place after the troughs are in position. Obviously, this filler panel could be formed as a leg extending from the bottom of a trough, the top of a trough, or two half legs extending from both the top and the bottom of each trough. FIG. 48 shows an arrangement where each trough has a half leg extending from the top and bottom of each trough. FIG. 49 shows an arrangement where each trough has a full leg extending from the top (or optionally the bottom) of each trough. Such legs may or may not mate with grooves/surfaces of other troughs. FIG. 48 shows a non-mating scenario, whereas FIG. 49 shows a mating interface. These arrangements have the possible advantage of enabling individual troughs being more easily removable from an assembled structure than other arrangements. However, if specialty troughs are not provided, this arrangement may pose some issues at the top or bottom tiers of an assembly, but is contemplated due to its simplicity and economy of manufacture. In any case, it may be desirable to provide means for closing off the rear of such an assembly to create a predominantly flat-faced fence or divider, or a unit more conducive to placing against an exiting wall. Again, as with all embodiments, the possible trough cross-sectional shapes could be numerous yielding alterations in structural-spatial properties, as well as aesthetic variations.

Figure 50:
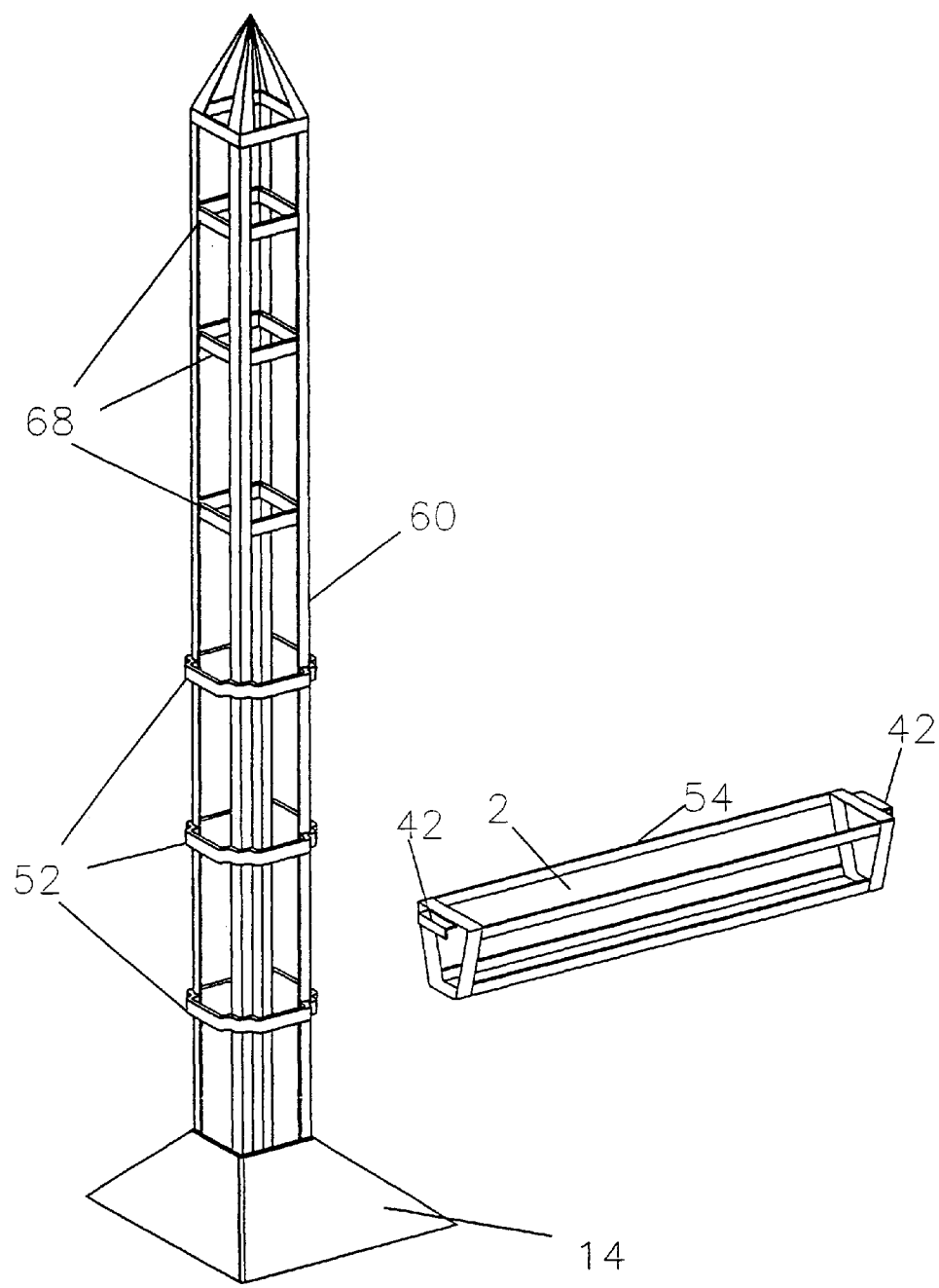
FIG. 50 is another trimetric view of the components of the invention in a ready to assemble relationship.

FIG. 50 further illustrates contemplated variation(s) on the invention, some of which have already been discussed. In FIG. 50, many of the same basic elements that have already been discussed can be seen such as; the hook-halos 52, a vertical post structure 60, and a trough structure 2. The illustration simply further illustrates that a variety of materials or processes could be used to achieve the spirit of the invention. In this case, either parts of, or the entire structure could be constructed in a very open or skeletal way through by example strapping illustrated by reference character 54. Strapping material could be wood, metal (that could be bent and fastened through welds, rivets, screws etc.), plastic or any other suitable material. The resulting open trough structure could be lined with a flexible material commonly used for planters such as burlap, or coconut, etc. or a relatively rigid liner of plastic or ceramic etc. could be used. The foot structure 14, as well as the post structure 60, could also be fashioned in such a way. Reference character 68 shows that, if the structure is "skeletal," alternative hook halos 68 could be relatively flush with the post structure (fitting relatively within the structure), as opposed to the hook halos already discussed, illustrated by reference character 52. So a variety of materials, processes or configurations are possible using the same basic elements or features. Again, as with all embodiments, the possible trough cross-sectional shapes could be numerous yielding alterations in structural-spatial properties, as well as aesthetic variations.

Also contemplated in certain embodiments of the invention are various means of leveling the trough, or support surfaces when the units are used on uneven ground. Such leveling means could be accomplished in several ways. One such way is to level the support posts relative to each other. Several methods could be employed for this ranging from adjustable feet on the pedestal 14, to being able to angle the post assembly relative to the pedestal 14. Another contemplated method is the ability to alter the angle or heights at the hooks 42, or hook halos 52 as best seen in FIG. 50. Again, several modes of accomplishing this are possible and anticipated. The halos 52 could have adjustable attachment means such as a plurality of attachment holes on vertical element 60, or hook 42 may have an inherent adjustment mechanism or a similar adjustable attachment as that disclosed for the halos 52. In the cases of FIGS. 1 through 9, similar adjustments could be incorporated into the stacking elements interface with each other. An example of this is to have an adjustment means between support receptacle 16, and male component 6, as best seen in FIG. 1.

FIGS. 10-23 relate to other embodiments of the invention. The following embodiments relate to the formation of brackets that are used to interconnect other suitable construction materials for the formation of desired planting configurations. Examples of some of the materials envisioned are wood timbers and planking commonly used in the building of fences and decks, extruded or otherwise formed plastic/metals, and cast materials such as concrete/plastic/composites. Wood products timbers/planking are used for the illustrations. The materials and methods of manufacture for the brackets themselves could be as diverse as those just mentioned or referred to in earlier embodiments.

Figure 11:
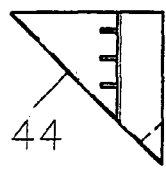
FIG. 11 is an end-view of FIG. 10.
Figure 10:
FIG. 10 is a top-view of another embodiment of the invention that uses bracket-connectors.
Figure 12:
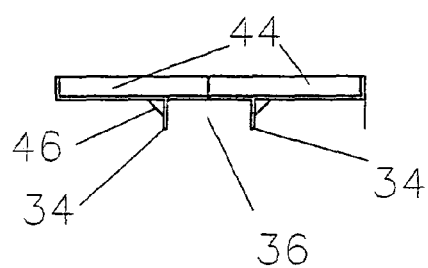
FIG. 12 is a top-view of two brackets in their relative positions for a small timber.
Figure 14:
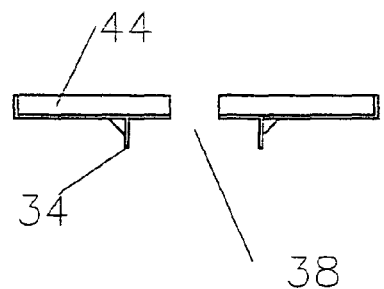
FIG. 14 is a top-view of two brackets in their relative positions for a larger timber.
Figure 13:
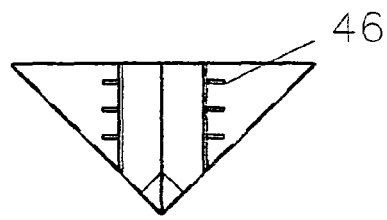
FIG. 13 is an end view of FIG. 12.
Figure 15:
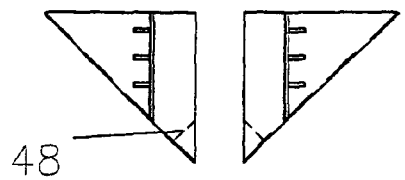
FIG. 15 is an end view of FIG. 14.
Figure 16:
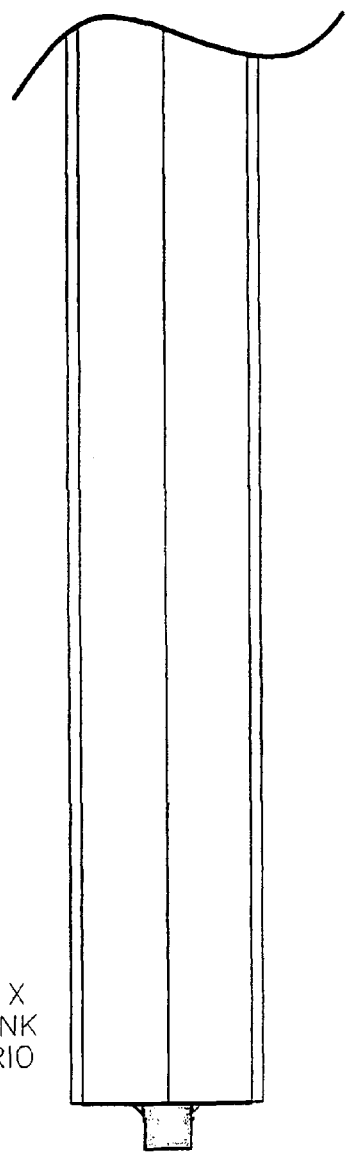
FIG. 16 is a top-view of two brackets in their relative positions for a small timber, with the timber in place and the trough forming planking in place.
Figure 17:
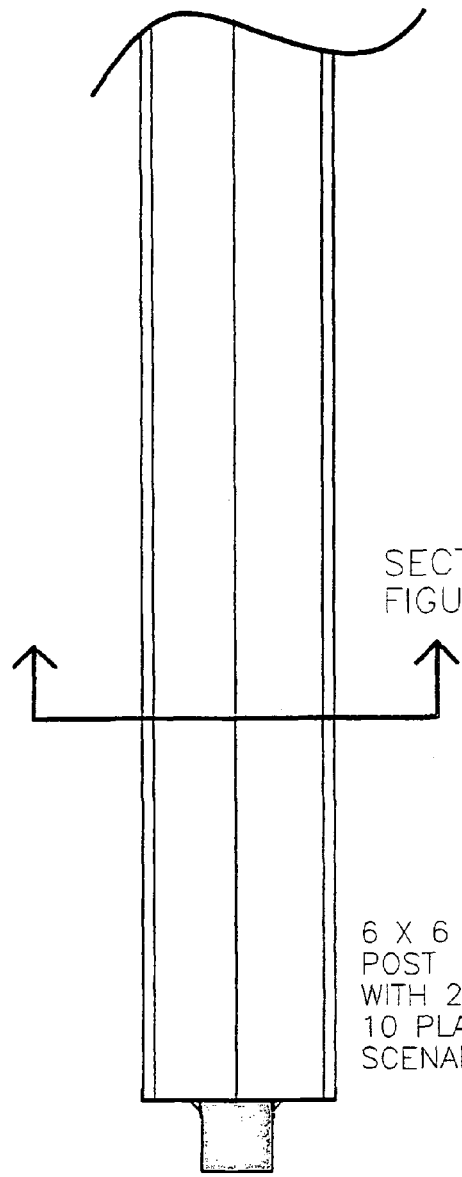
FIG. 17 is a top-view of two brackets in their relative positions for a larger timber, with the timber in place and the trough forming planking in place.
Figures 18, 19:
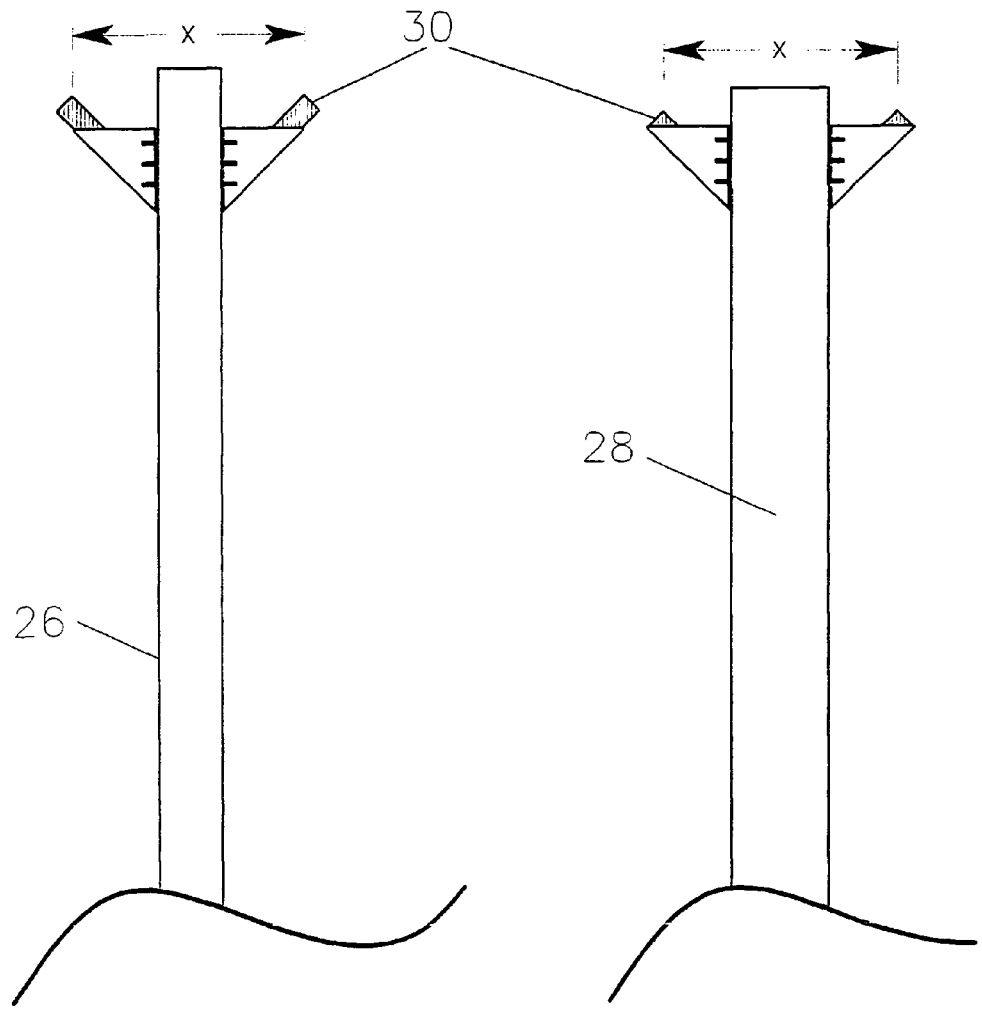
FIG. 18 is an end-view of two brackets in their relative positions for a small timber, with the timber in place and the trough-forming lumber in place.
FIG. 19 is an end-view of two brackets in their relative positions for a larger timber, with the timber in place and the trough-forming lumber in place.
Figures 20, 21:
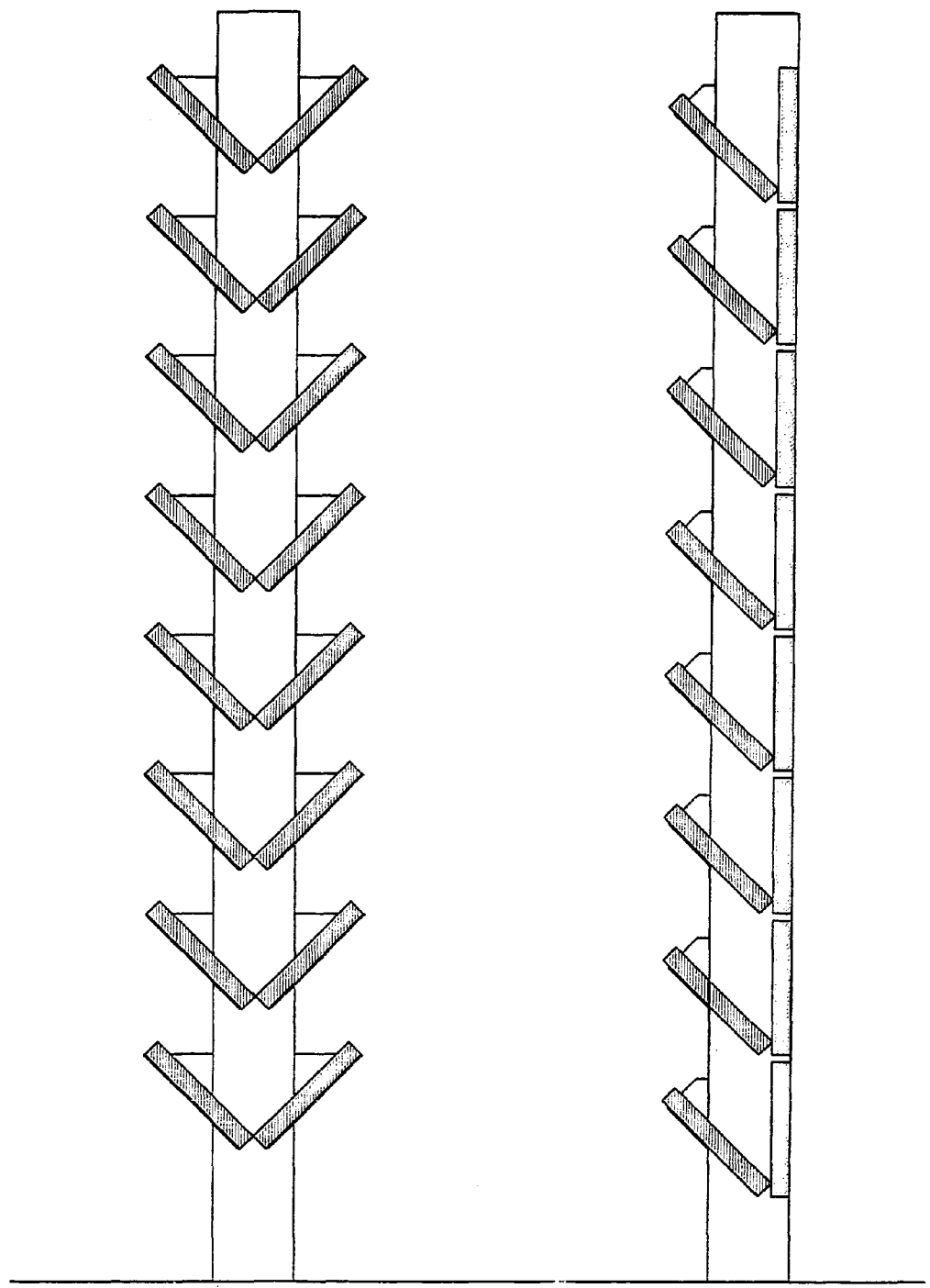
FIG. 20 is a sectional view of FIG. 17 showing multiple planting levels.
FIG. 21 is a sectional view of FIG. 23, showing multiple planting levels in a format that is conducive for creating a wall, fence or placing against an existing wall.

Referring to FIG. 10 a top view of one type of bracket can be seen. FIG. 11 shows an end view of the same bracket. FIG. 12 shows a top view of the same bracket in a spaced relationship with another bracket, its mirror image. Two such brackets make up a pair. And the same pair may be used on either end of the assembly. Some main features of the bracket are the flanges 32 for receiving planking material, and the flanges 34 that between a pair of units form an area 36/38 for a timber/upright support. Additionally there can be holes provided (not shown) for receiving nails or screws to attach the brackets to the timbers and planking. FIG. 13 is an end view of FIG. 12. FIG. 14 is essentially the same as FIG. 12 except that the same two brackets are spaced apart more for reasons that will soon be realized. FIG. 15 is an end view of FIG. 14. FIGS. 18 and 19 show end views of the brackets mounted to their timbers 26 and 28. Note that timber 28 is larger than timber 26, yet the same brackets may be used. Additionally, the same size- or differing sized planking material 30 may be used. It is simply mounted in two differing positions along support flange 44, which could have indication marker 48. Two typical dimensions for such post timber in North America are 4"×4" (actual 3.5"×3.5") and 6"×6" (actual 5.5"×5.5"). So an important feature of this design is the ability for the bracket to compensate for these two lumber sizes but also for the variations of size one normally encounters within a given size due to manufacturing and environmental tolerances. By making the brackets, through design, able to handle these stock and other sized timbers, a single set of brackets can be manufactured and marketed for two different end-users. Also, the invention may be incorporated into existing structures such as patio decks as well as new construction. Referring to FIG. 16, a top view of FIG. 18 can be seen. Referring to FIG. 17, a top view of FIG. 19 can be seen. Referring to FIGS. 18 and 19 it can be seen that the same approximate size planter is possible with the same sized planking material selected. (The dimensions are for illustrative purposes only and not meant to limit the actual sizing of the invention). Referring to FIG. 20 a sectional view of FIG. 17 can be seen showing many levels of planking and associated brackets assembled onto timbers (only one is visible). It should be appreciated that the fit of the planking at the base of the "V" should allow for ample drainage, however, more drainage can be provided by simply allowing a greater space between the intersection of the two planks to exist.

Figure 22:
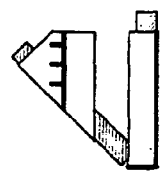
FIG. 22 is an end view of FIG. 21 (note for clarity, the upright timber is not shown.).
Figure 23:
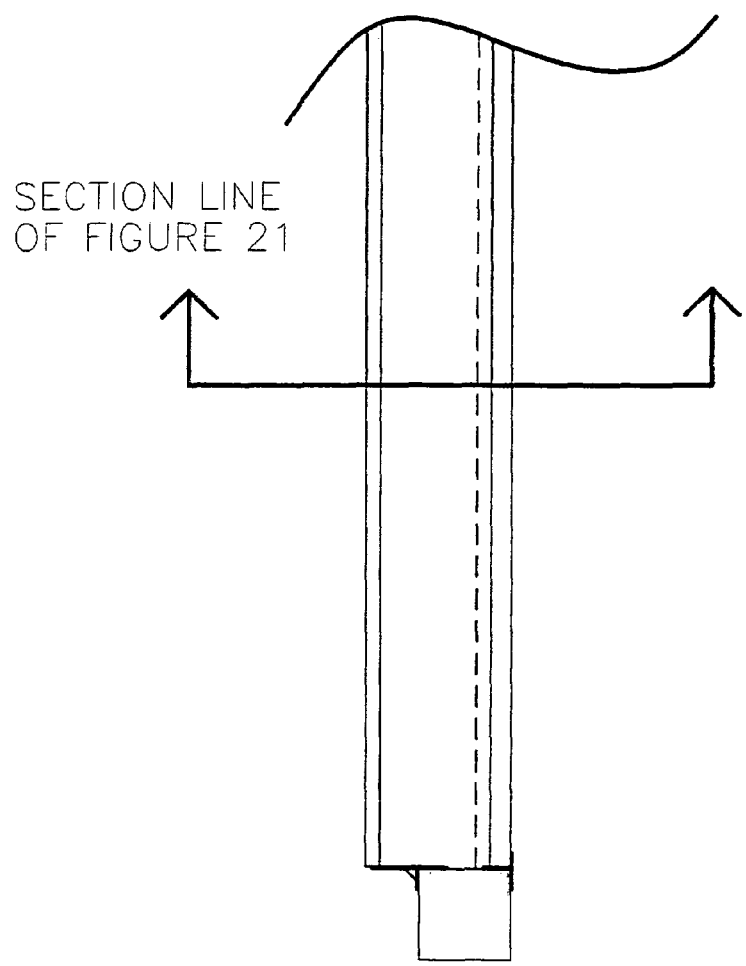
FIG. 23 is a top view of another embodiment of the invention showing a planting format that is conducive for creating a wall, fence, or placing against an existing wall.

Referring to FIG. 22 another embodiment of the invention can be appreciated. FIG. 22 is an end view of a pair of brackets that now form a trough with a vertical back wall. In this way it is possible to create a planting system that is one sided and the opposite side forms a wall or fence. In addition to being able to create a wall or a screen, this configuration is also conducive to placing an assembled unit against a wall. A trough of this basic configuration is a possible variation that is applicable to any, and all of the embodiments in this disclosure. Referring back to FIG. 22, the brackets again allow several degrees of freedom allowing several sizes of timber and planking. FIG. 23 is a top view of FIG. 22. FIG. 21 is a sectional view of 23 showing many levels of brackets and planking in place. It should be noted that by appropriately spacing the assemblies a solid wall could be achieved as well as one that allows the wind to pass through. As already mentioned the brackets are designed so that they may fit on existing construction. One such method could be the use of only the angular brackets of FIG. 22 in conjunction with an existing fence and its posts where the fence itself creates the rear vertical wall of the trough.

Additionally, other bracket configurations that share the same basic features already described are possible. The most notable of these is a corner bracket that provides the ability to form a turn around a timber where the use of two of the brackets already described would have to overlap. One such example of this is the 90-degree turn seen in FIG. 26. Another can be seen in FIG. 27. Other variations would enable all of the possibilities found in FIG. 25 to be achieved through the use of brackets, posts and planking. Additionally, through the already discussed application-combinations, any of these brackets may be used with any of the disclosed trough and/or post configurations disclosed throughout this application.

Figure 52:
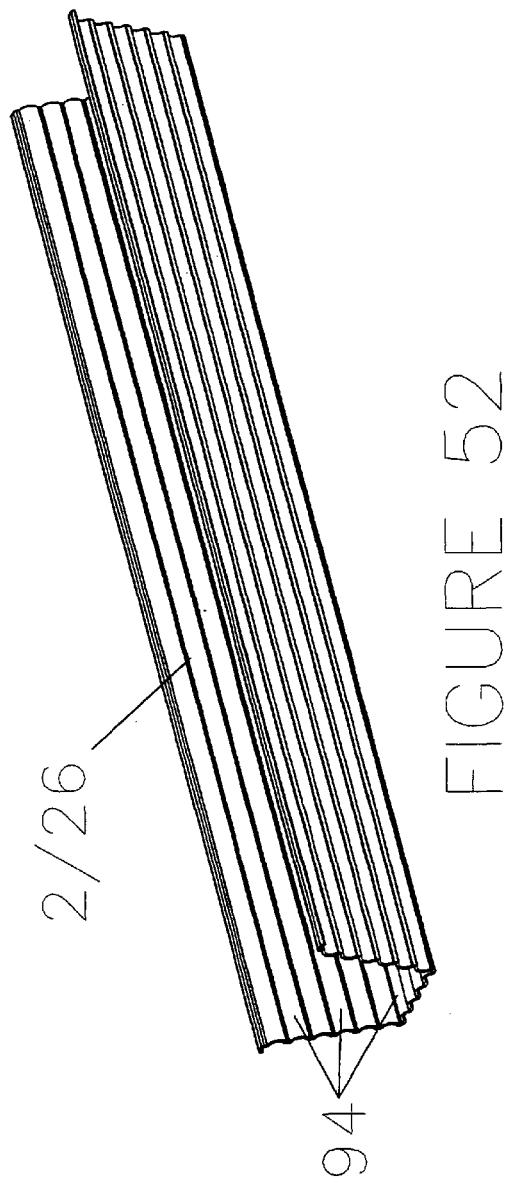
FIG. 52 is a trimetric view of a trough.

Referring to FIG. 52, another contemplated embodiment profile can be seen. As in all other embodiments, this profile could be a fabrication, a molding or an extrusion. It is very similar to some of the profiles shown in previous Figures, but shows that greater strength can be gained by undulating or corrugating, 94, the surface. This structurally is the equivalent of adding ribs to the design. And so, corrugation or ribs or a combination of the two stiffening methods may be selectively added to the inside surfaces of the trough 2/26, to the outside surfaces of the trough 2/26, or added to a combination of the two surfaces. If the product were extruded, normally these features, ribs or undulations would occur in the line of extrusion, or along the length of the trough. This does not have to be the case though. Ribs and other features deemed necessary, such as drain holes, might be added through secondary processes. Other manufacturing methods such as in-die injection molding can often accommodate features that occur at angles to each other. Here too, however, it may be advantageous to add these features, stiffening or not as secondary processes, pieces or a combination of the two.

Figure 53:
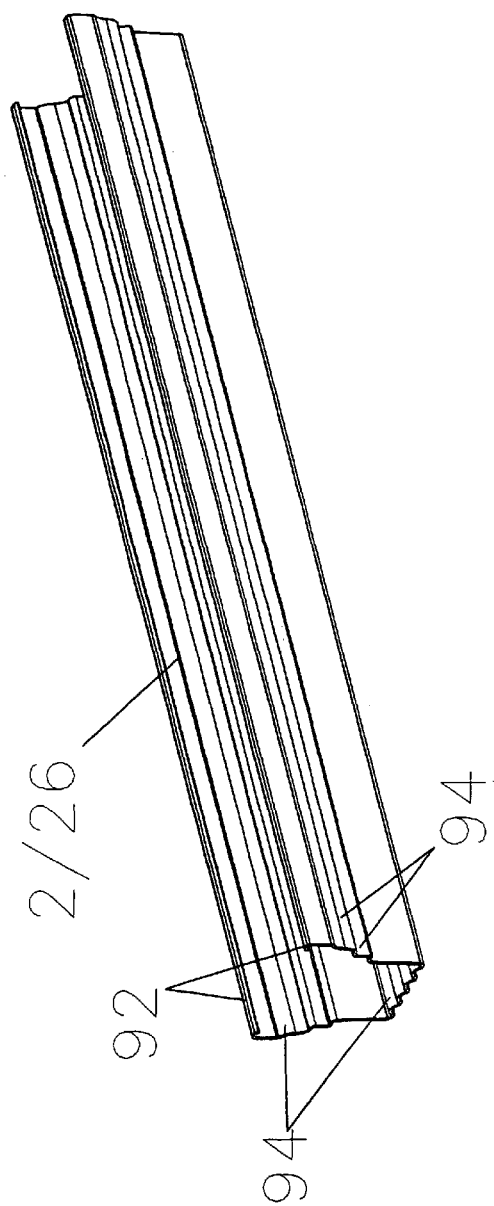
FIG. 53 is a trimetric view of a trough.

FIG. 53 is much like FIG. 52, which just shows another architectural configuration of corrugation, and that some legs 92 may be turned inward instead of outward, which has the effect of giving a more finished, or thicker, more expensive look to a single wall construction. Additionally, sharp edges may be protected, and again, corrugation 94 can be seen.

Figure 54:
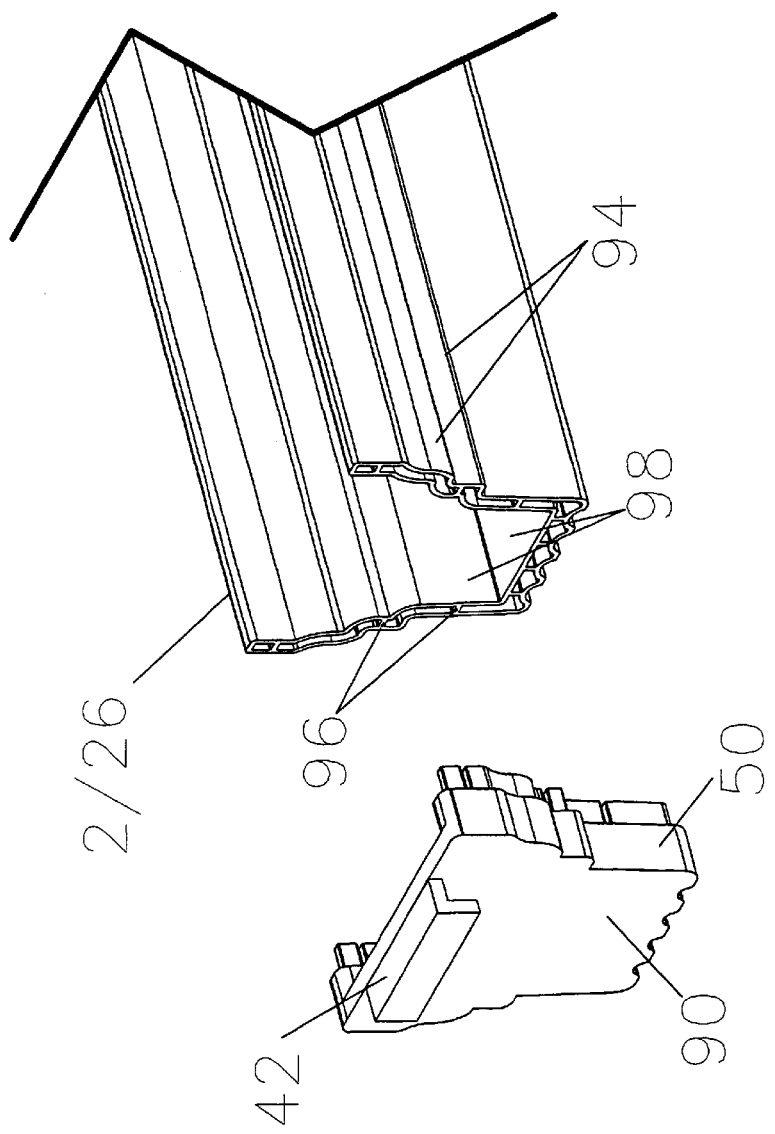
FIG. 54 is a trimetric view of a trough, and its end wall or end cap, separated from the trough.

Referring to FIG. 54 it can be seen that both corrugations 94 and ribs 96 are illustrated. Additionally, an external or second-shell wall 98 has been employed. This further strengthens the structure. This is especially important when greater spans are to be achieved without excessive deflection of the troughs. Additionally, this method allows greater strength to be attained without having to go to a thicker, solid structure, which would be heavier and more costly to manufacture. It should be noted that while FIG. 54 depicts a two-wall structure with connecting rib structures, any number of stacked or "honeycombed" walls might be constructed in order to achieve the strength required. So three-wall, four-wall, etc, etc, structures are equally envisioned. A preferred method of construction is extrusion, whether of aluminum, plastic polymer, a clay-based or cement-based product, or any other extrudable material. Additionally, other processes could be employed such as fabrication. So various combinations, which may include corrugation, ribs or ribbing, and multiple walls may be employed to achieve the necessary strength required of the product.

Figure 55:
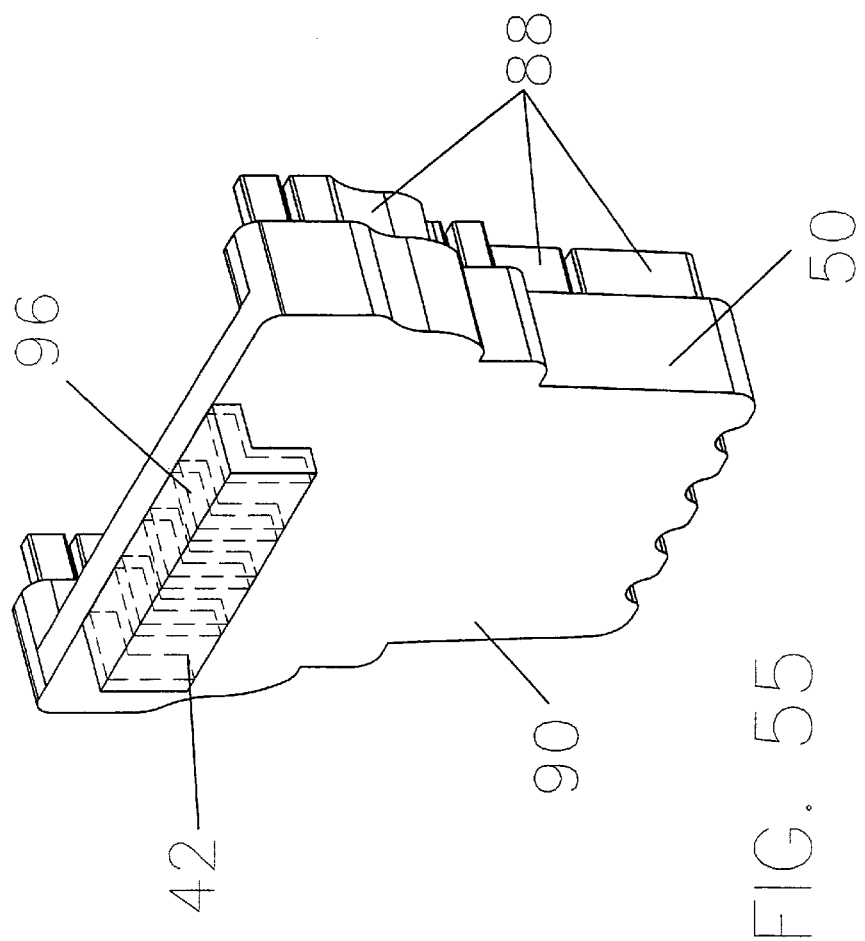
FIG. 55 is an enlarged view of the separated end wall or end cap of FIG. 54.
Figure 56:
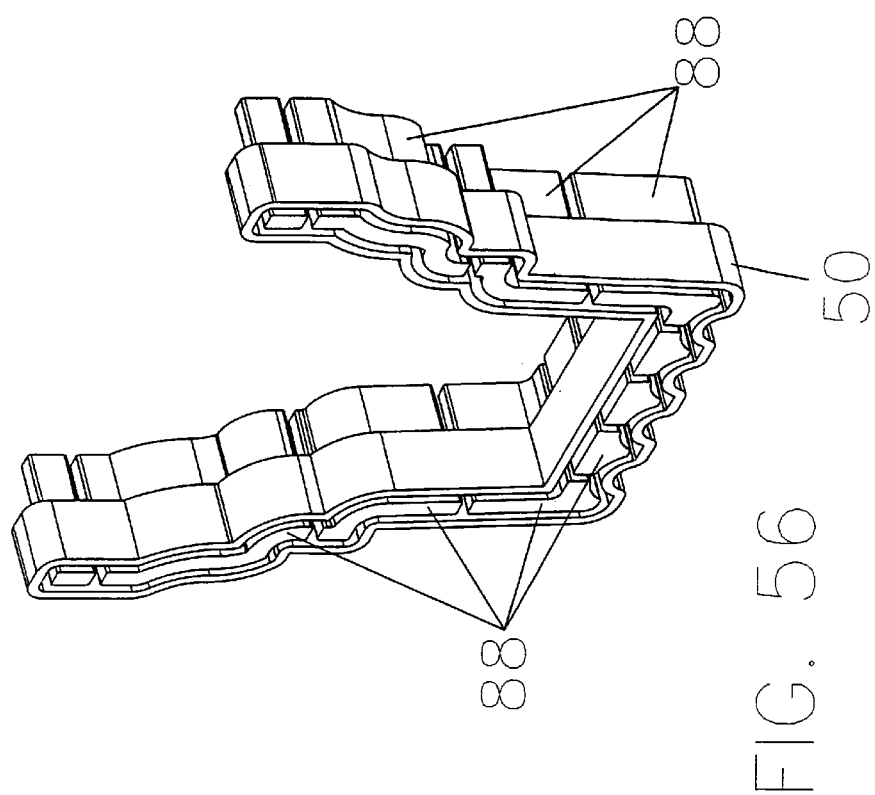
FIG. 56 is an enlarged view of the separated end wall, or end cap of FIG. 55, with its surface or wall 90, removed for clarity.
Figure 57:
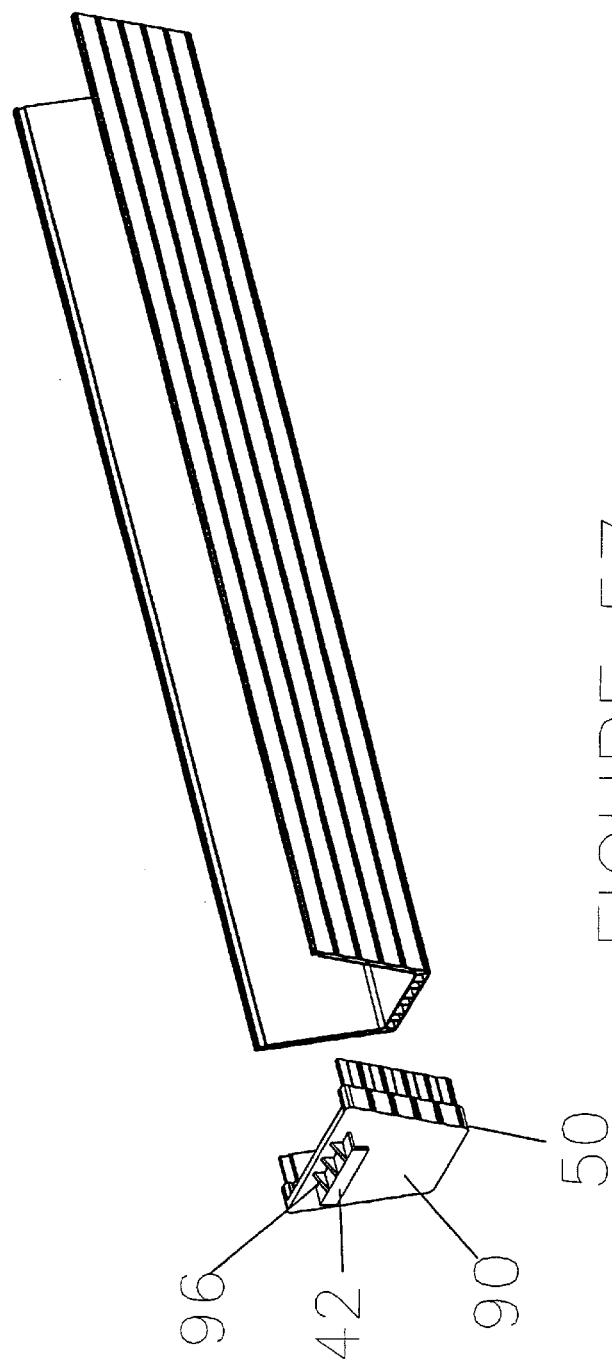
FIG. 57 is a trimetric view of a trough, and its end wall, or end cap separated from the trough.

Referring to FIG. 55, an end wall or end cap can be seen. FIG. 56 shows the same end wall or end cap without its front wall for clarity. Of note is the way in which sleeving members or protrusions 88 may interface with the corrugations, and/or ribs, and/or second wall of the trough of FIG. 54. This is especially useful when these elements are fabricated from more than one piece, as the greater surface area aids in welding (solvent, ultrasonic, heat, etc) or aids in the use of adhesives, or aids in the use of mechanical fasteners. Mechanical fasteners could be oriented perpendicular to the long axis of a trough, thus going through the side wall(s) of a trough 2/26 and through the end cap and its protrusions. Or the fasteners could be oriented in line with the long axis of a trough so that a fastener were to go through the front wall 90, of an end wall/end cap 50, and the through protrusions 88, which may have a split in them. In this way, protrusions 88 may expand, locking the end wall/end cap 50 to the inner faces/features of a trough, much as an expandable drywall or concrete insert and fastener works.

Figure 58:
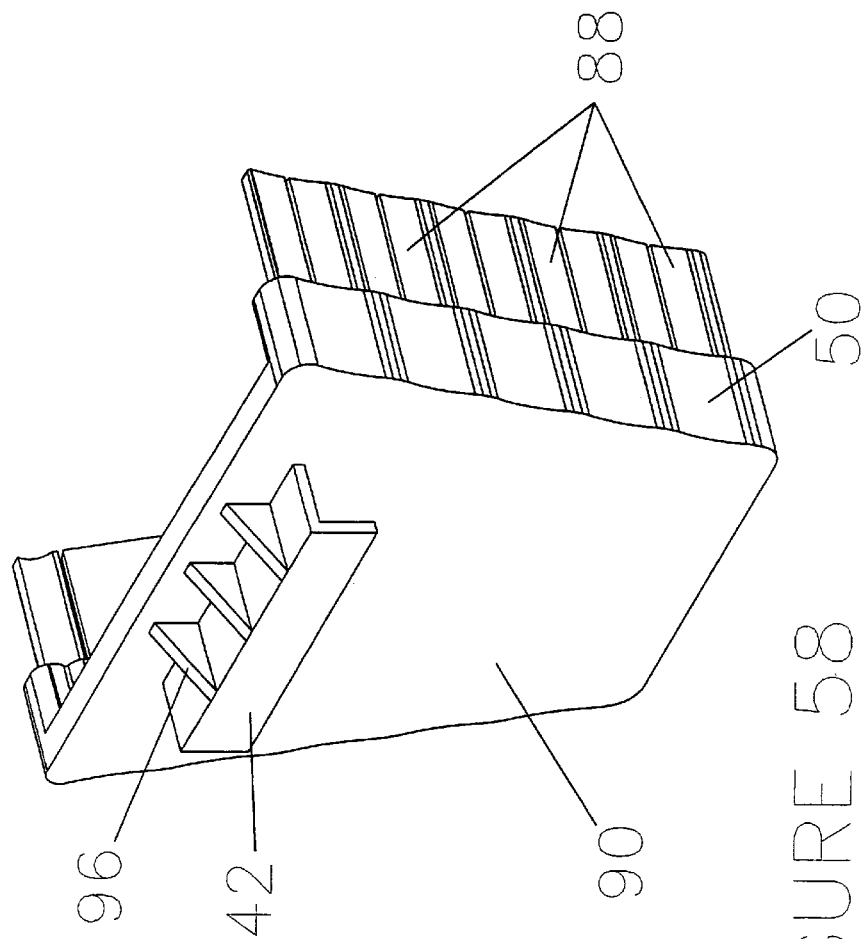
FIG. 58 is an enlarged view of the separated end wall or end cap of FIG. 57.
Figure 59:
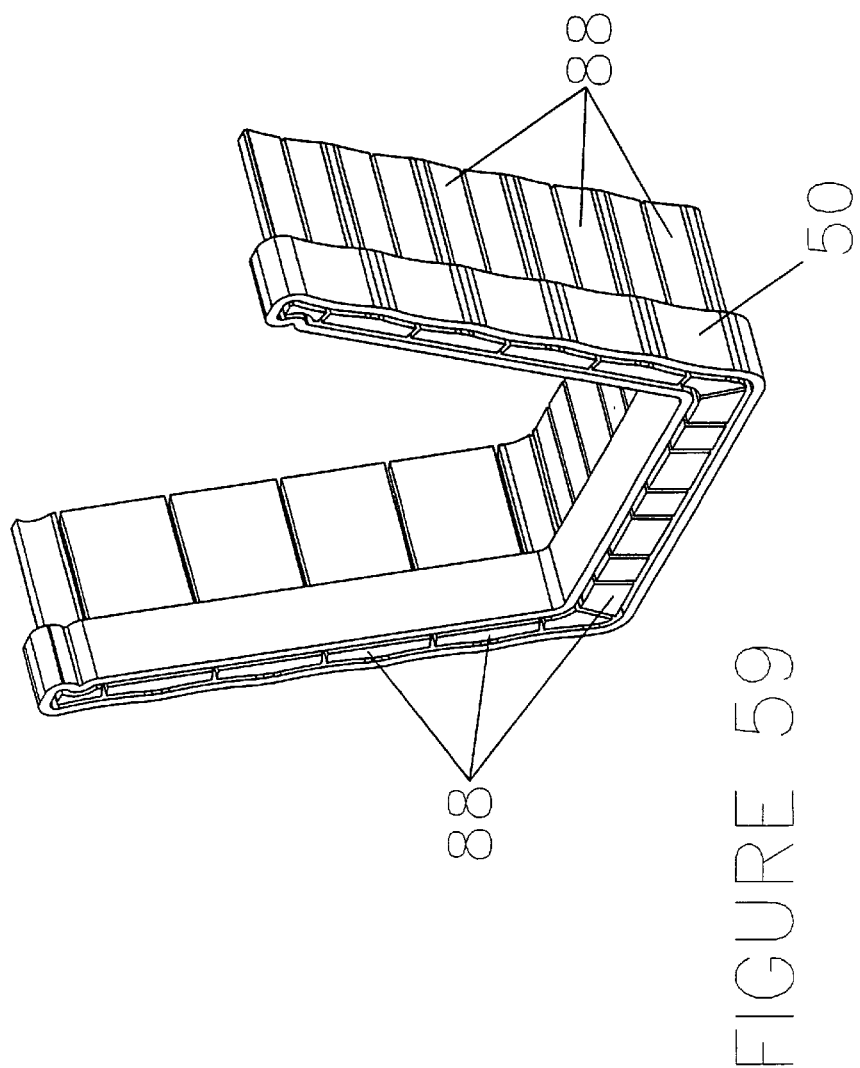
FIG. 59 is an enlarged view of the separated end wall, or end cap of FIG. 58, with its surface or wall 90, removed for clarity.

Refer now to FIGS. 55 and 58. In some cases it is desirable to provide the hook element 42 with some type of reinforcement ribbing for reasons already cited for adding ribbing elsewhere. Such ribbing 96 may be on the underside of 42 as can be seen in FIG. 55, or on the upper side as can be seen in FIG. 58.

As has already been disclosed it may be advantageous to allow the troughs to be oriented at various angles to each other. (In all embodiments, a certain amount of angle is achievable through the fit of the parts used. For example, if hooks and halos are sized appropriately, angular orientation can be achieved.) Orienting a halo-hook on each face of a post is one such method that has been disclosed, as well as a rotating joint for incremental to infinite angular adjustment. A post may have a variable number of faces: three, as in a triangular post section, four, as in a square or rectangular post section, or six or eight, as in an octagonal or hexagonal post section. Alternatively, just the halo or trough receiving members on a post could accommodate all or some of these angular increments, without the entire post having to be an octagon, etc. Yet another method for accomplishing this angular orientation is to produce the hook element 42, at an angle to the trough 2/26. One way is to angle the hook relative to the end of the trough or end cap. And another way is to configure the entire end of the trough or end cap to be at an angle relative to the trough.

Figure 60:
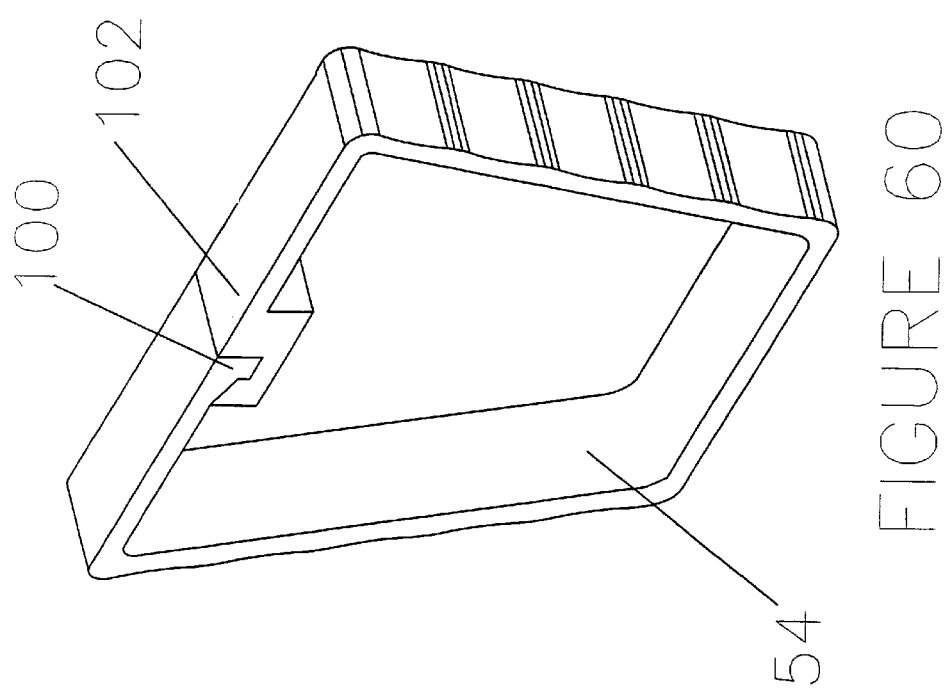
FIG. 60 is a trimetric view of a structural strap or brace.

The advantages of a strap or brace at intervals along to trough have already been discussed. Such a strap could be just across the top of the trough, as item 54 does in FIG. 43, along one or more walls as 28 does in FIG. 24, or able to completely wrap around/encircle a section of the trough as can be seen in item 54 in FIG. 60. Referring to FIG. 60, it can be seen that the strap or brace 54, may be constructed of one or more pieces. As depicted, it is one piece that has a split, so that the strap may be stretched around a section of a trough, and then fastened. Such a fastener could be glues, screws, heat or solvent bonding etc. by providing an appropriate fastening surface such as 100, or 102. Or the fastener may be integral, such as a hook and latch as can be seen by again referring to FIG. 60. Fastening surface 100 may have a feature that may interlock with fastening surface 102, so that 54 may become a closed shape. These fastening surfaces may occur on any side or face of the brace. Additionally, it may be desirous to further fasten the strap or brace to a trough, and an appropriate fastening surface such as 100, and 102, and corresponding features may be incorporated.

Referring now to FIGS. 61-69, another system that is directed at a solution for making the components fold down, or otherwise become more compact when not in use may be seen. The utility of the invention may be further enhanced when the components are not being used, or are in an "out-of-use" mode, by incorporating features which allow the components or members of the components to nest with each other, and/or fold for greater storage and shipping efficiency. Another feature contemplated is the ability for some of the elements to have provisions for resizing. Thus the same components may have more than one size potential while in their "in-use position".

Figure 61:
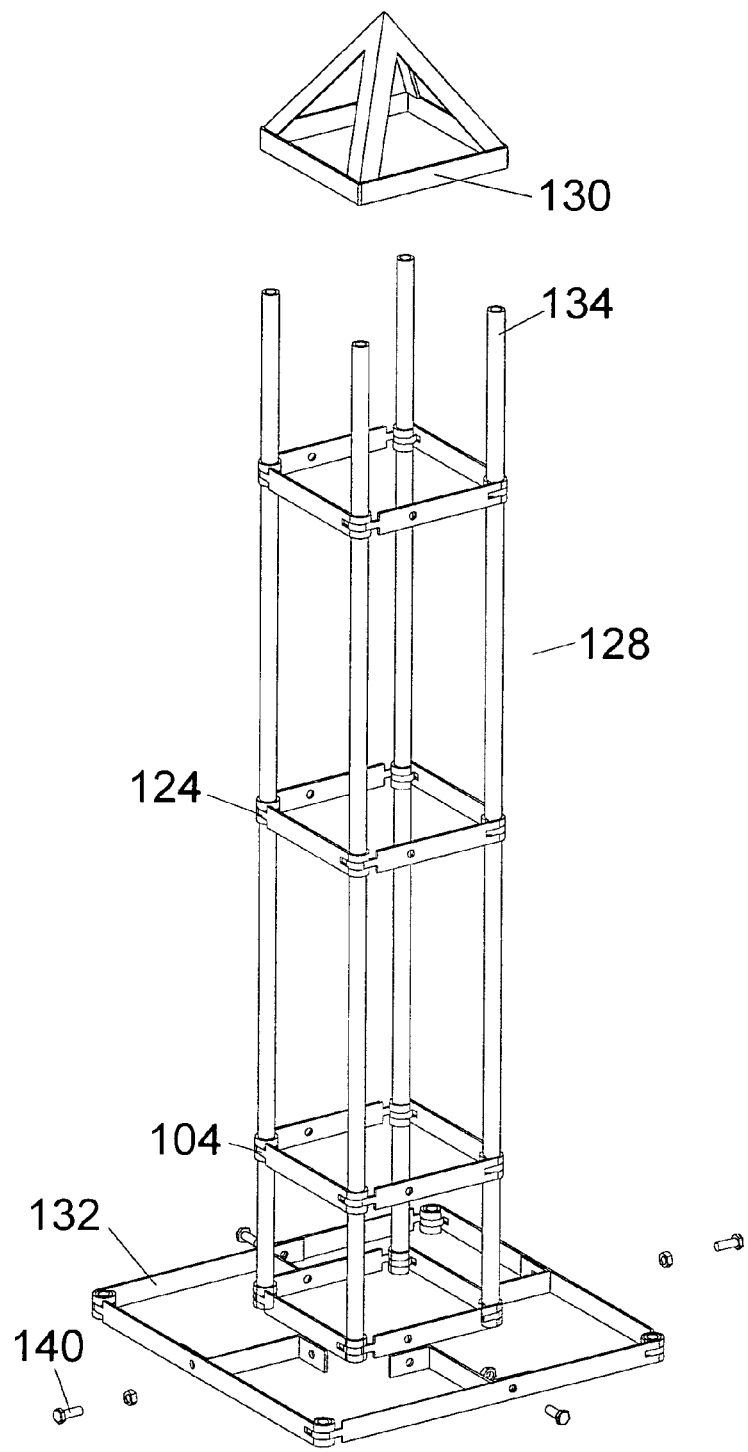
FIG. 61 is a trimetric view of another embodiment of the invention showing a version of the posts section which is foldable or collapsible in nature. Its structure is has some similarities to that of FIG. 50, as well as other disclosed embodiments, but some additional inventive features have been added to enable it to be collapsible or foldable.
Figure 67:
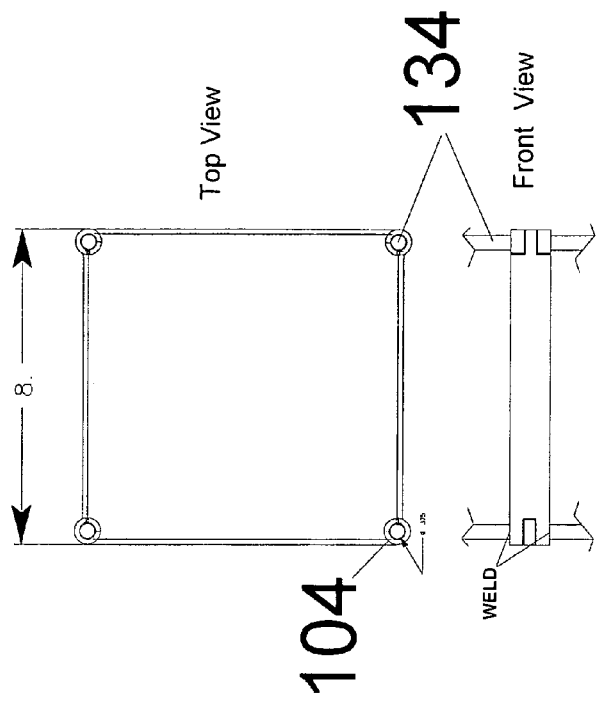
FIG. 67 is a front and top view of an assembly made from the elements of FIG. 66.
Figure 66:
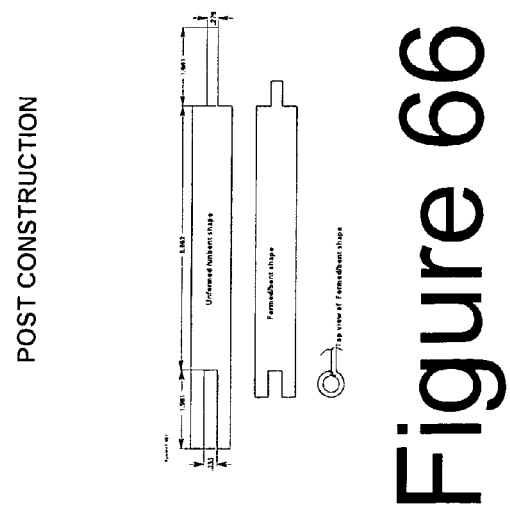
FIG. 66 is a front elevation view of one proposed hanger/hinge construction in a preformed condition and a formed condition.
Figure 68:
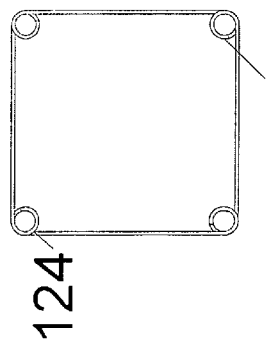
FIG. 68 is a top view substantially the same as that in FIG. 67.
Figure 69:
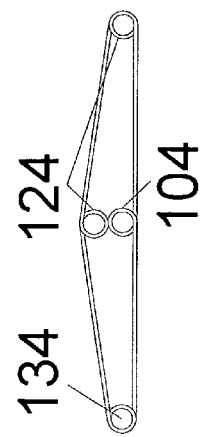
FIG. 69 is a top view substantially the same as that in FIG. 68, but showing a folded/storage position.

Referring specifically now to FIG. 61, a trimetric view of another embodiment of the invention showing a version which is foldable or collapsible in nature can be seen. While its structure has some similarities to that of FIG. 50, some additional inventive features have been added to enable it to be collapsible or foldable. Pivots 104, 120, 124 etc. enable the post structure to parrellagram and fold down into an out of use position. The cap structure, 130 other structure, bolts, fins etc. may serve as a means to keep it locked in an in-use position. The base structure 132, may fold in a similar manner. This folding action may be seen by referring to FIGS. 68 and 69, which is a top view of the center section of a post structure. This depiction is also representative of one form of a base structure as in FIG. 61. Of note is that FIG. 68 is an unfolded, or in-use position, whereas FIG. 69 is a folded, in-use position. Also of note in FIG. 69, if the generally rectangular sections, posts, and bases, are made non-square, in other words, a true rectangle where two opposing sides are greater in length than the other two opposing sides, than pivot 120 and 124 will not interfere with each other allowing for a more compact fold. Referring to FIGS. 66 and 67 it can be seen how this hinge hanger may be formed by a single formed shape (used repeatedly four times per halo area) and one side of the formed shape may be optionally welded (to maintain height/spacing) to the rod-tube upright 134.

Figure 26:
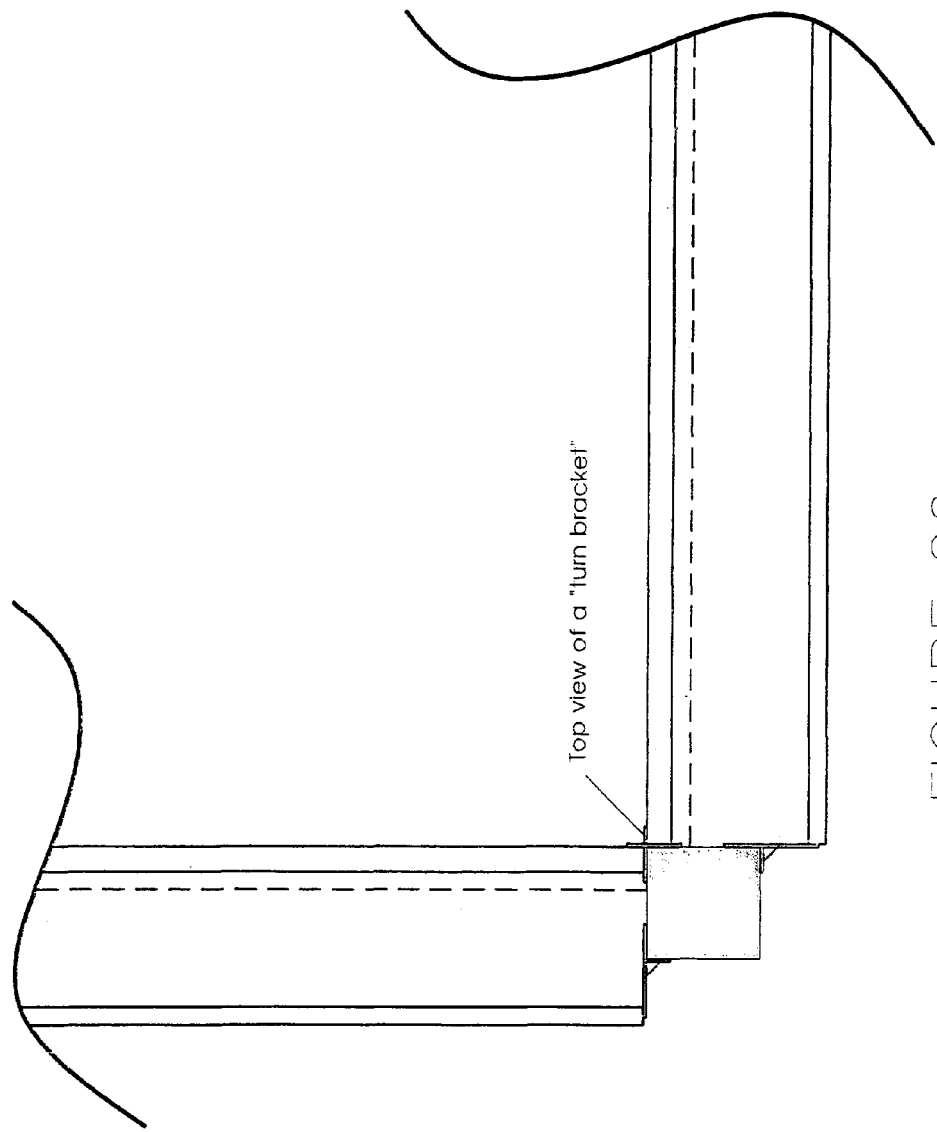
FIG. 26 is a top view of a turn bracket.
Figure 27:
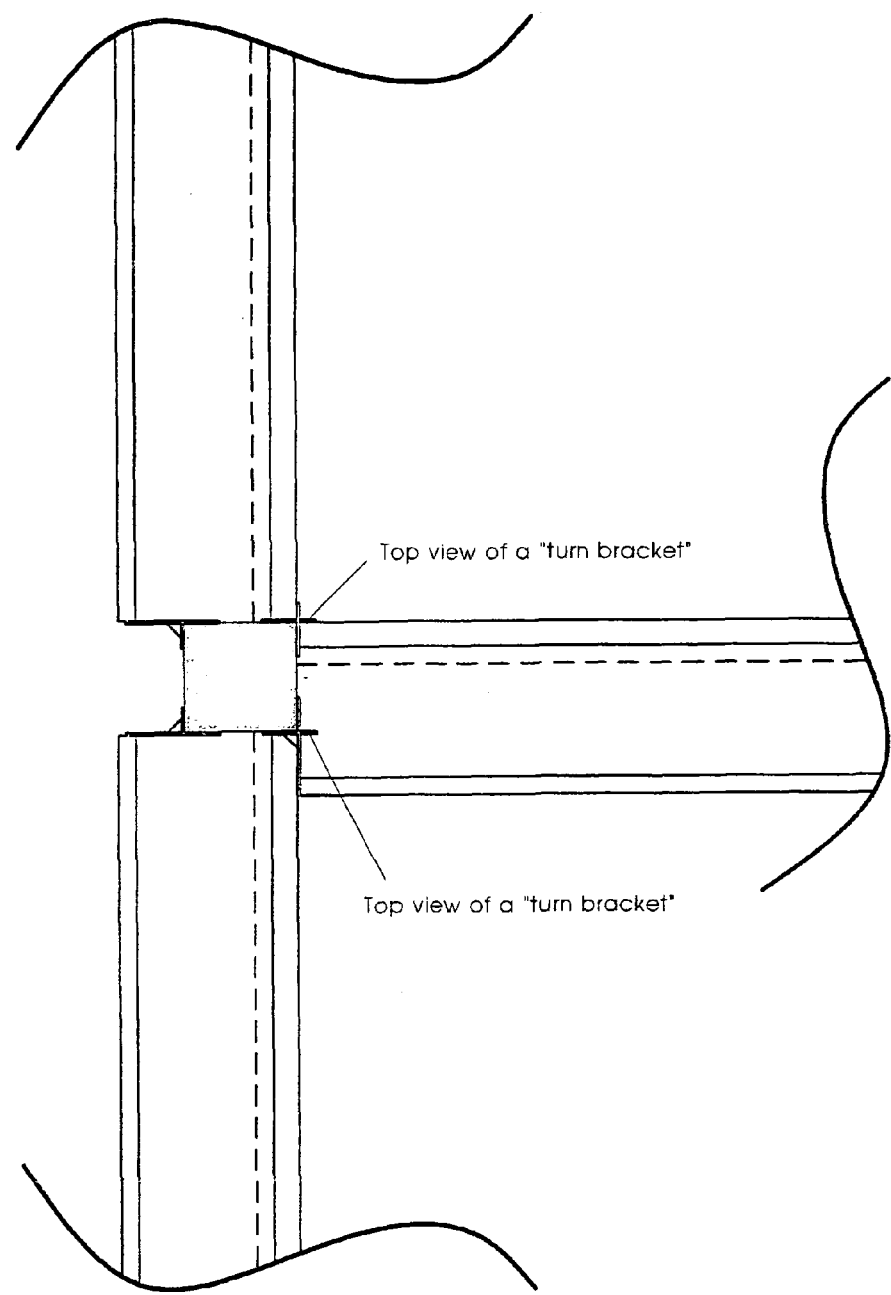
FIG. 27 is a top view of another turn bracket.
Figure 62:
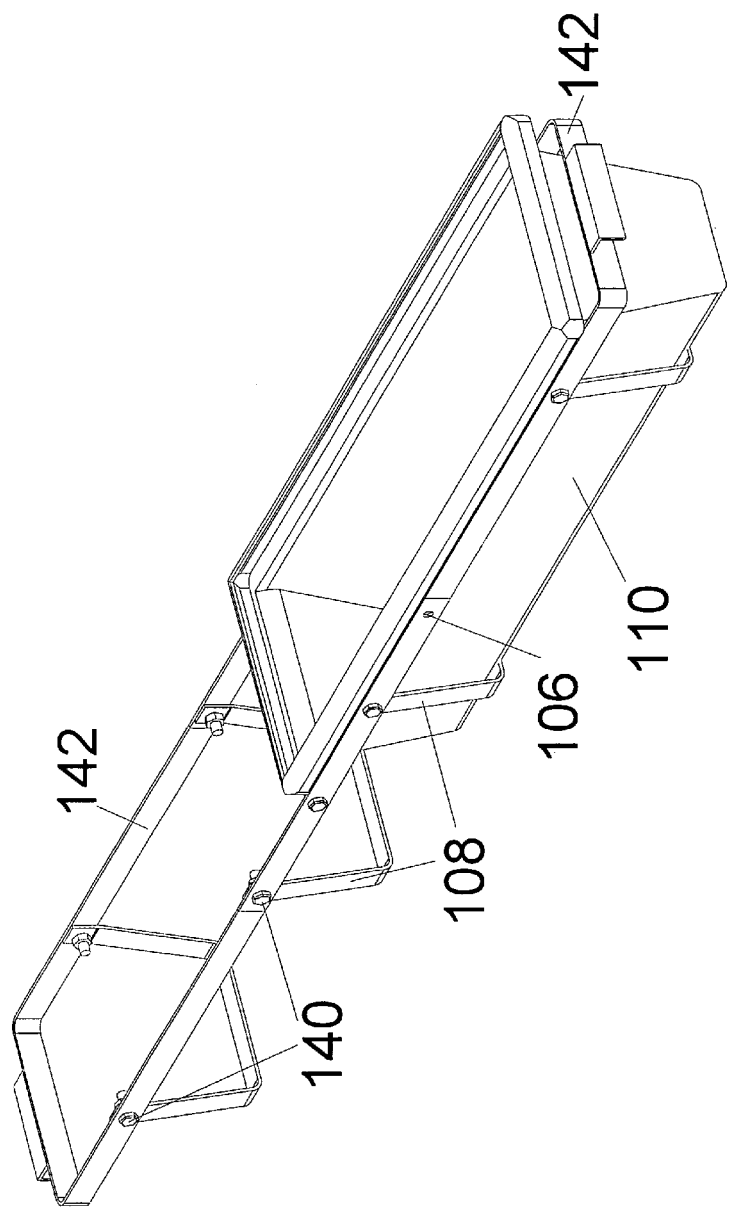
FIG. 62 is a trimetric view of another embodiment of the invention showing a version of the trough section which is foldable or collapsible in nature. Its structure is has some similarities to that of FIG. 50, as well as other disclosed embodiments, but some additional inventive features have been added to enable it to be collapsible or foldable.
Figure 63:
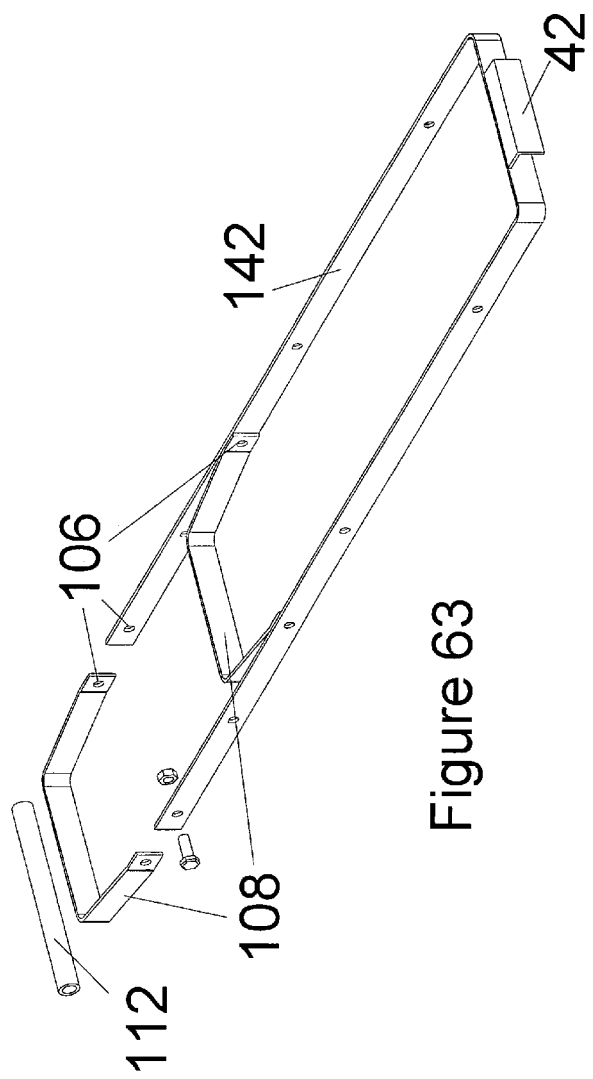
FIG. 63 is a trimetric view substantially similar to that of FIG. 62, but showing fewer elements.

The troughs, or plant supports may fold in a couple of manners. Referring to FIG. 62 one mode may be seen. In it hangers 108 may swing from an out of use position to an in-use position. FIG. 26 is representative of an unfolded in use position, whereas FIG. 63 shows the hanger 108 in a swung up position. It should be noted that in this embodiment, the material usage has been maximized. The material supporting the span (longest length) of the support is on edge thus giving the greatest buckling strength, and the hangers, which are under a tensile load fully fold into the profile of span section of the support. It also should be noted that the hangers 108 may be substituted with chain, rope or other tensile, load-bearing self-foldable structure. In FIG. 62 we can see that separate planters 110, may be used. However as in other embodiments, separate planters may be used or coco mesh or other similar semi-flexible structure may be supported by hangers 108, or the trough section may be slab sided with pivots in the appropriate adjoining sides. Thus the spirit of a hinge structure as described is not limited to the embodiments that are rather open in nature and structure as those depicted in FIGS. 50 and 62 whether we are referring to the posts, the bases, or the support structures. On the contrary, the generally solid appearing embodiments as in FIGS. 1-9, 24,25, and 31 through 57 could all employ and benefit from a similar pivoting, folding, and collapsing capabilities. In these instances, the four sides of the generally square upright posts, would be connected in a pivotable/hinging manner to its adjacent side, allowing the structure to fold in a parallelogram manner like a partially disassembled cardboard box, and the trough section as already described may be slab sided with pivots in the appropriate adjoining sides. And a base, if needed, would fold similarly. In any of the cases, the top cap or capitol may serve to lock the posts/supports in their deployed/unfolded position. Other ways of holding the posts, bases and supports in their in use position include but are not limited to; detents, bolts, pins, and locking sleeves, button activated or otherwise.

Figure 64:
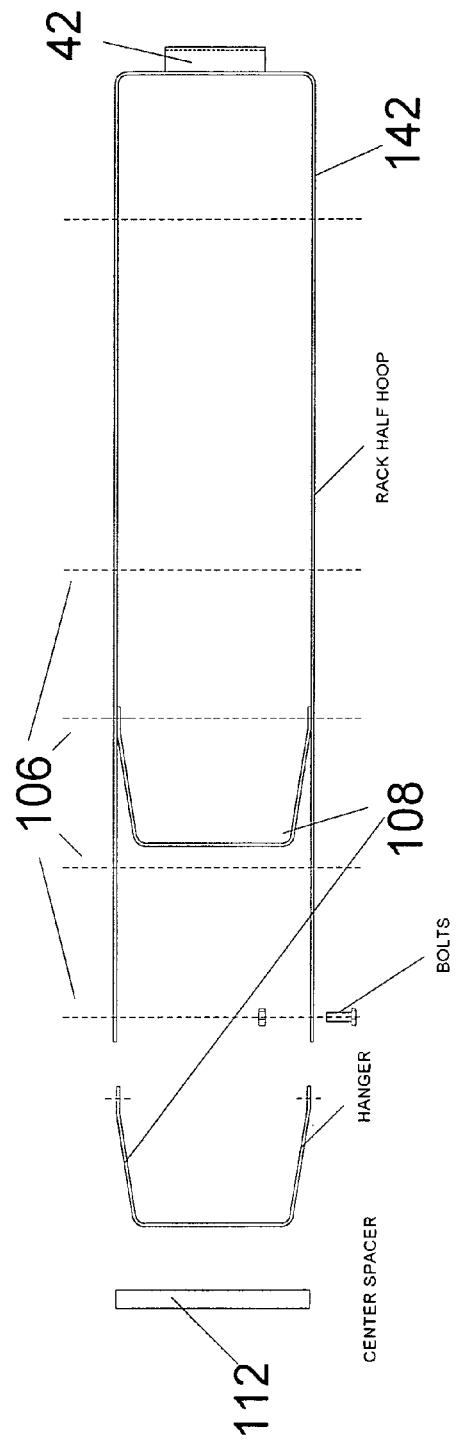
FIG. 64 is a top view of FIG. 63.
Figure 65:
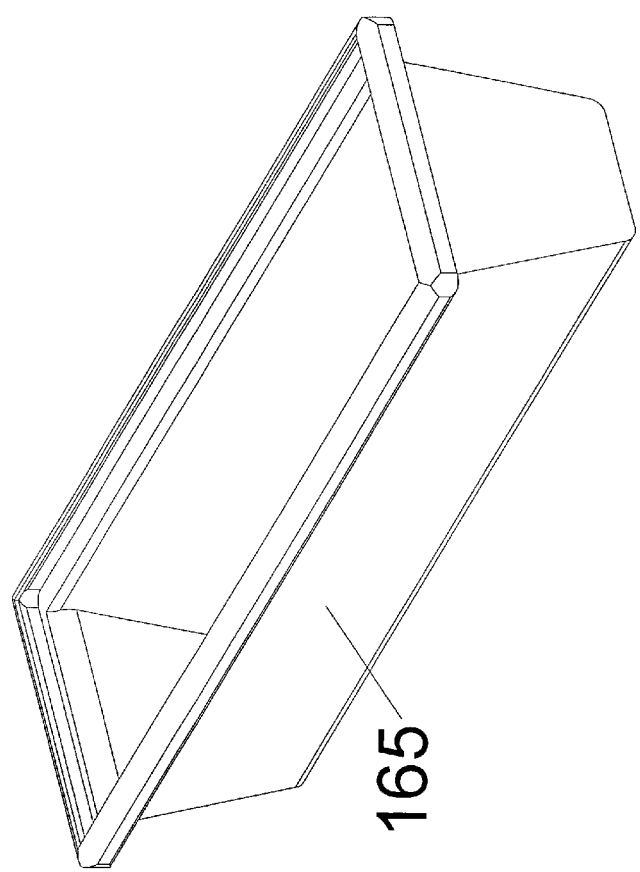
FIG. 65 is a trimetric view of a planter box which may be used with various embodiments of the invention.

Additionally it is anticipated the main support members may be positioned create different sized supports or troughs, or to accommodate different standard sized planters. Common planter sizes are 12 inches, 24 inches and 30 inches. By making the system expandable and thus contractible, these sizes may be accommodated with the same components. Additionally, different sizes may be accommodated in the same structure. One side may have a 24 and the other side may have a 30. One inventive way in which the invention accomplishes this is to produce a half-support as can be seen in FIGS. 63 and 64. Note that the structure of 62, 63, and 64 have a plurality of carefully spaced boltholes. Two of these optionally identical structures, when positioned as lefts and rights may be bolted, or affixed slidably or otherwise to create a support with differing lengths and furthermore with different dimensioned receiving areas. A spacer 112, may serve to separate the two areas, and provide further stability to the support structure. Thus the overall length may be changed as well as the sub-division of the space.

Figure 70:
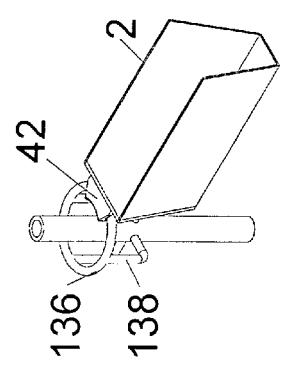
FIG. 70 is a trimetric view of a section of a post structure and a section of a plant support structure. This view shows another way in which the support halo may be configured to allow the plant support structure to radiate in a multitude, or infinite number of angles relative to the post structure, or other plant support structures.
Figure 71:
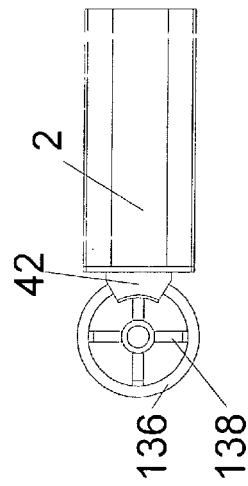
FIG. 71 is a top view of that illustrated in FIG. 70.
Figure 72:
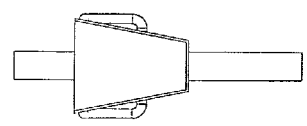
FIG. 72 is a side view of that illustrated in FIG. 70.
Figure 73:
FIG. 73 is a front view of that illustrated in FIG. 70.
Figure 74:
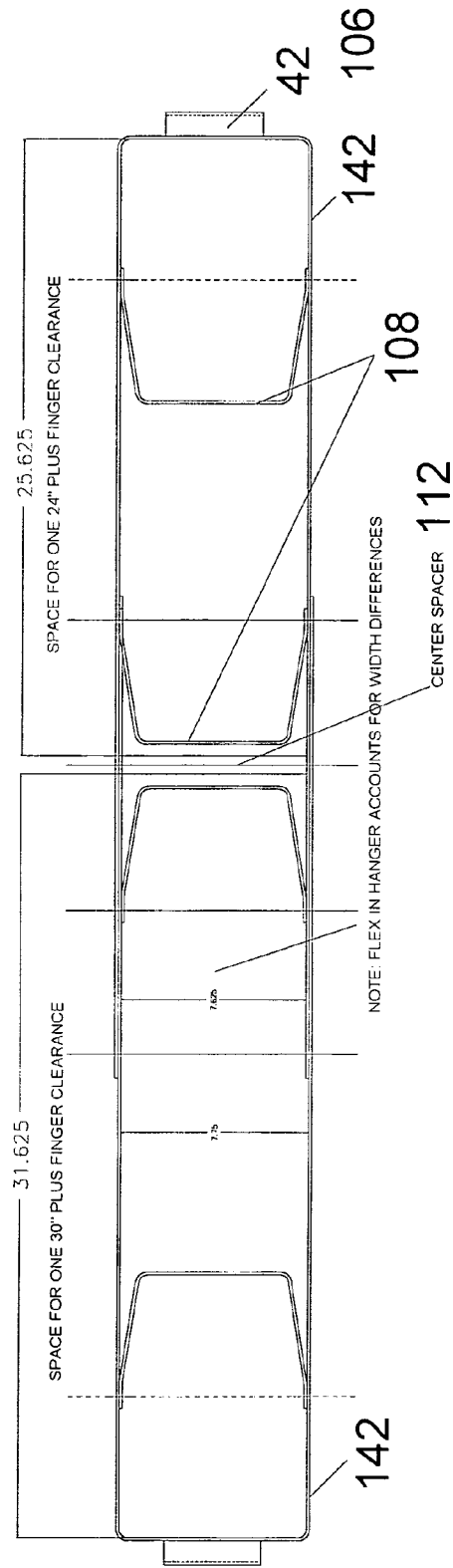
FIG. 74 is a top view of combinations of the parts also seen in FIGS. 62, 63, and 64.

Referring now to FIG. 70, which is a trimetric view of a section of a post structure and a section of a plant support structure. This view shows another way in which the support halo may be configured to allow the plant support structure to radiate in a multitude, or infinite number of angles relative to the post structure, or other plant support structures. By the connection of the halo upper surface 136 to the post by connection structure 138, which is configured in a way that the connecting member never interferes with the hook 42, of the plant support structure, the plant support structure to radiate in a multitude, or infinite number of angles relative to the post structure, or other plant support structures. Thus the plant support structures may radiate in a full 360 degree manner from any given post at any given level, enabling a the user to achieve a nearly infinite number of configurations. Note while a circular/infinite halo upper surface is depicted, as in previous embodiments, a faceted scenario is also anticipated if incremental angles are desired.

Thus, improved methods for creating many and varied planting configurations and storage structures have been disclosed. The structures may have an in use position, configuration or relationship, and a second out of use position, configuration or relationship better suited for storage or other out of use applications. Additionally the structures may have more than one in-use size or configuration

I claim:
1. A system for holding plants comprising;
   a. a first post structure, having four first generally vertical parallel bars joined in circumferentially spaced relation by 4 first generally horizontal bars oriented generally perpendicular to said four generally parallel bars to form an integral assembly having a first in use form and a second out of use form,
   b. a second post structure having four second generally vertical parallel bars joined in circumferentially spaced relation by 4 second generally horizontal bars oriented generally perpendicular to said four generally parallel bars to form an integral assembly,
   c. at least one planer, generally horizontal, plant support structure disposed between said first and second post structures supported by said at least one of said 4 first generally horizontal bars on said first post structure and supported by at least one of said 4 second generally horizontal bars on said second post structure,
   d. at least one pivot associated with said first post structure and said 4 first horizontal bars, where said first post structure can pivotally change from said first in use form to said second out of use form, where said second out of use form is more compact in at least one dimension than said first in use form.

2. The invention of claim 1, where said first post structure is generally a 4 sided, 4 cornered, parallelogram in cross section and has said at least one pivot located generally at least one corner of said parallelogram cross section.

3. The invention of claim 2, where said first post structure has four of said pivots.

4. The invention of claim 3, where said first post structure has said four pivots located generally at the 4 corners of said cross section.

5. The invention of claim 1, where said second post structure has at least one associated pivot point.

6. The invention of claim 1, where said plant support structure has at least one associated pivot point.

7. The invention of claim 6, where said plant support structure can change from an in use form to a second out of use form, where said second out of use form is more compact in at least one dimension than said first in use form.

8. A system for holding plants comprising;
 a. a first post structure, having a first in use form and a second if out of use form, and said first post structure is generally a 4 sided, 4 cornered, parallelogram in cross section, and said first post structure has 4 pivots disposed generally at the 4 corners of said parallelogram cross section,
 b. a second post structure, having a first in use form and a second out of use form, and said second post structure is generally a 4 sided, 4 cornered, parallelogram in cross section, and said second post structure has 4 pivots disposed generally at the 4 corners of said generally parallelogram cross section,
 c. at least one planer, generally horizontal plant support structure disposed between said first and second post structures,
 d. where said first post structure can pivot about said pivots disposed generally at said 4 corners of said structures cross section to change from said first in use form to said second out of use form, where said second out of use form is smaller than said first in use form in at least one dimension.

9. The invention of claim 8, where said plant support structure has means to go from a first in use form to a second out of use form, where said second out of use form is smaller in at least one dimension than said first in use form.

10. The invention of claim 9, where said plant support structure further includes a generally U shaped hanger structure pivotally connected to said plant support structure by at least one pivot point, where said generally U shaped hanger structure can pivot about said pivot point to change from said first in use form to said second out of use form, where said second out of use form is more compact than said first in use form in at least one dimension.

11. The invention of claim 10, where said plant support structure includes a plurality of generally U shaped hanger structures.

12. A modular assembly for holding plants, the assembly comprising:
 a. a first post comprising four generally parallel bars joined in circumferentially spaced relation by a brace to form an integral assembly;
 b. a second post;
 c. at least one support, comprising spaced apart first and second ends and first and second generally parallel, spaced apart bars secured together by said first and second ends, a first hook located on the first end of said support; a second hook located on the second end of said support;
 d. a first hook receiving portion located on said brace and engaged with said first hook, thus supporting said first end of said support; a second hook receiving portion located on said second post, thus supporting said second end of said support;
 e. at least one pivot associated with said first post structure, where said pivot joins at least one of said four generally parallel bars to said brace, where said first post structure can pivotally change from said first in use form to said second out of use form, where said second out of use form is smaller in at least one dimension than said first in use form.

13. The invention of claim 12, wherein said support is adapted for holding a trough.

14. The invention of claim 12, wherein said at least one support is further defined as being constructed of a first generally "U" shaped element, and a second generally "U" shaped element, where both of said first and second generally "U" shaped elements are further characterized as having a base section connected to a first extending section said first extending section having a first end connected to said base section and a second, unconnected free end distal to said first end, and a second extending section where said second extending section has a first end connected to said base section and a second, unconnected free end distal to said first end where said first and second extending sections of said first generally "U" shaped element, and said first and second extending sections of said second generally "U" shaped element overlie each of the other.

15. The invention of claim 14, where the dimensional amount that said first generally "U" shaped elements said first and second extending sections, and said second generally "U" shaped elements said first and second extending sections overlie each of the other may be varied, where said at least one support can be of a variable size.

16. The invention of claim 14, wherein said support further comprises at least one generally "U" shaped hanger.

17. The invention of claim 16, wherein said support and said generally "U" shaped hanger are joined by at least one pivot, where said pivot joins at least one of the said first and second generally "U" shaped elements to said brace, where said support and said generally "U" shaped hanger can pivotally change from a first in use form to a second out of use form, where said second out of use form is smaller in at least one dimension than said first in use form.

18. The invention of claim 12 wherein said second post comprises first and second spaced apart members defining an axis of said second post and said first hook receiving portion secured to said first and second spaced apart members, extending generally circumferentially relative to said second post axis.

19. The invention of claim 18 wherein said second post further comprises third and fourth spaced apart members that are spaced apart from said first and second spaced apart members of said second post and extend generally parallel to said axis, and further comprises a second, third and fourth hook receiving portions, wherein said second, third and fourth hook receiving portions are secured to said third and fourth spaced apart members, wherein said four spaced apart members of said second post are disposed at four corners defining a generally rectangular cross-section post.

20. The invention of claim 19 wherein said first, second, third and fourth hook receiving portions are secured to said first, second third and fourth spaced apart members with a first, second third and fourth pivot, where said first post structure can pivotally change from said first in use form to said second out of use form, where said second out of use form is smaller in at least one dimension than said first in use form.

* * * * *